United States Patent
Wurzelbacher, Jr. et al.

(10) Patent No.: US 7,886,903 B1
(45) Date of Patent: Feb. 15, 2011

(54) ARTICULATED NOTEBOOK COMPUTER COVER AND MOUNTING DEVICE

(75) Inventors: Richard T. Wurzelbacher, Jr., San Francisco, CA (US); Richard A. Kuhn, Salt Lake City, UT (US)

(73) Assignee: Aileron Designs, LLC, San Francisco, CA (US)

( * ) Notice: Subject to any disclaimer, the term of this patent is extended or adjusted under 35 U.S.C. 154(b) by 0 days.

(21) Appl. No.: 12/557,329

(22) Filed: Sep. 10, 2009

Related U.S. Application Data

(60) Provisional application No. 61/192,679, filed on Sep. 19, 2008.

(51) Int. Cl.
*B65D 85/00* (2006.01)

(52) U.S. Cl. .................. 206/320; 206/576; 248/288.31; 248/919

(58) Field of Classification Search ................. 206/320, 206/576, 523, 521; 248/919–923, 288.31, 248/288.51
See application file for complete search history.

(56) References Cited

U.S. PATENT DOCUMENTS

| | | | |
|---|---|---|---|
| D358,483 S | 5/1995 | Cross et al. | |
| 5,632,373 A | 5/1997 | Kumar et al. | |
| 5,724,225 A | 3/1998 | Hrusoff et al. | |
| 5,938,096 A | 8/1999 | Sauer et al. | |
| 6,109,434 A | 8/2000 | Howard, Jr. | |
| 6,585,212 B2 | 7/2003 | Carnevali | |
| 6,663,072 B1 * | 12/2003 | Ritchey et al. | ............... 248/444 |
| 7,191,926 B1 * | 3/2007 | Costantino et al. | .......... 224/605 |
| D543,700 S | 6/2007 | Parker et al. | |
| D557,897 S | 12/2007 | Richardson et al. | |
| 7,303,077 B2 * | 12/2007 | Harlocker | ................... 206/576 |
| 7,327,562 B2 | 2/2008 | Littlepage | |
| 7,441,734 B2 * | 10/2008 | Liou | ........................ 248/205.5 |
| 7,444,176 B2 * | 10/2008 | Oda et al. | ................. 455/575.3 |
| 7,643,274 B2 * | 1/2010 | Bekele | ................... 361/679.02 |
| 2003/0217940 A1 | 11/2003 | Russell et al. | |
| 2006/0042996 A1 | 3/2006 | Picot et al. | |
| 2006/0169608 A1 * | 8/2006 | Carnevali | .................... 206/320 |

(Continued)

OTHER PUBLICATIONS

"Manfrotto Professional Video Supports," Lino Manfrotto and Co., S.p.A., 2007, available at <http://www.manfrotto.com.au/PDFPages/Manfrotto_Video_2007.pdf>, retrieved Sep. 10, 2009, 60 pages.

(Continued)

*Primary Examiner*—Ehud Gartenberg
*Assistant Examiner*—Robert Poon
(74) *Attorney, Agent, or Firm*—Aka Chan LLP

(57) ABSTRACT

A protective shell for a portable computer includes an upper shell and a lower shell connected via hinges. The computer can be placed into the shell by slipping a first hinged section of the computer underneath a first clip of the upper shell and then bending back a second clip, made of a resilient material, of the lower shell to allow a second hinged section of the computer to slip into the lower shell. The hinges are positioned on the protective shell so that they will be concentric or approximately concentric with a hinge of the portable computer when the protective shell encases the portable computer. A mounting plate may be removably attached to the shell to allow the shell to be connected to various mounting arm assemblies.

20 Claims, 8 Drawing Sheets

U.S. PATENT DOCUMENTS

| | | | |
|---|---|---|---|
| 2007/0012840 A1* | 1/2007 | Kalis et al. | 248/288.31 |
| 2007/0227923 A1* | 10/2007 | Kidakarn | 206/320 |
| 2008/0023283 A1 | 1/2008 | Sutker et al. | |
| 2008/0308437 A1* | 12/2008 | Lin | 206/320 |
| 2009/0009945 A1 | 1/2009 | Johnson et al. | |
| 2010/0224532 A1* | 9/2010 | Gonzalez | 206/576 |

OTHER PUBLICATIONS

"Ram Mount Vehicle Laptop Mounts, Printers Mounts & Accessories," National Products, Inc., 2006, available at <http://www.rammount.com/pdf/vehiclelaptopmounts2.pdf>, retrieved Sep. 10, 2009, 51 pages.

"Jotto Desk 5340ACD—vehicle mounting kit," CNET Reviews, Dec. 4, 2003, available at <http://reviews.cnet.com/search-results/jotto-desk-5340acd-vehicle/1707-5_7-30615127.html?tag=mncol;Ist>, retrieved Sep. 10, 2009, 1 page.

Ogg, Erica, "Notebook PCs for the accident-prone," Crave-CNET, Jun. 3, 2007, available at <http://news.cnet.com/8301-17938_105-9724993-1.html?tag=mncol>, retrieved Sep. 9, 2009, 2 pages.

Yamamoto, Mike, "A laptop case for paramilitary missions," Crave-CNET, Jun. 12, 2007, available at <http://news.cnet.com/8301-17938_105-9728790-1.html?tag=mncol>, retrieved Sep. 9, 2009, 1 page.

"Pelican Extends HardBack Line with Launch of the 1090 HardBack Case," Pelican Products, Inc., Jun. 25, 2008, available at <http://www.pelican.com/media/news/product/pr_06_25_08.php>, retrieved Sep. 10, 2009, 1 page.

"415NR Installation Instructions," RightAngle Products by K & A Manufacturing, Inc., Oct. 5, 2006, available at <http://www.rightangleproducts.com/Installs/RightAngle/415NR%20Instructions%201%20of%202.pdf> and <http://www.rightangleproducts.com/Installs/RightAngle/415NR%20Instructions%202%20of%202.pdf>, retrieved Sep. 10, 2009, 2 pages.

"415NSR Installation Instructions," RightAngle Products by K & A Manufacturing, Inc., Jan. 11, 2006, available at <http://www.rightangleproducts.com/Installs/RightAngle/415NSR%20Instructions%201%20of%202.pdf> and <http://www.rightangleproducts.com/Installs/RightAngle/415NSR%20Instructions%202%20of%202.pdf>, retrieved Sep. 10, 2009, 2 pages.

* cited by examiner

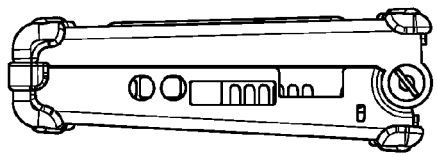
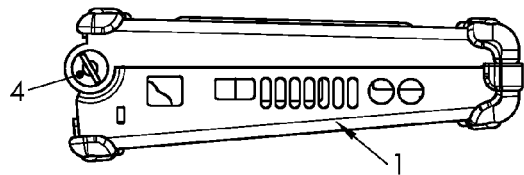
Fig. 13A                    Fig. 13B
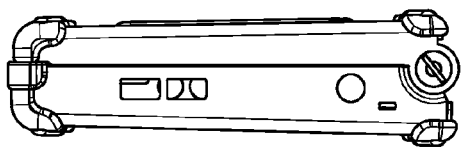
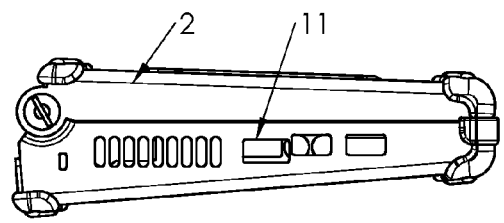
Fig. 13C                    Fig. 13D
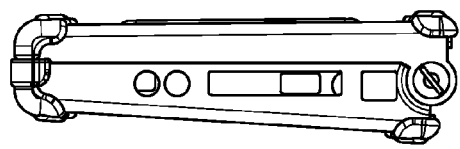
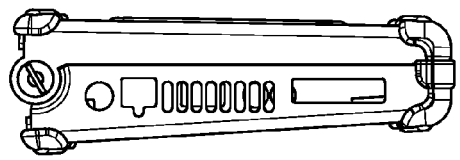
Fig. 13E                    Fig. 13F
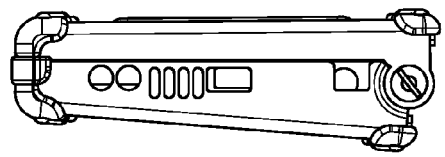
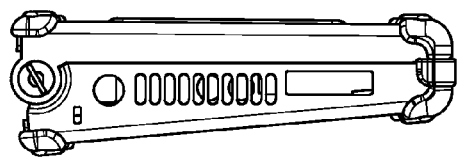
Fig. 13G                    Fig. 13H
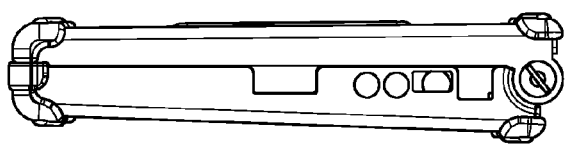
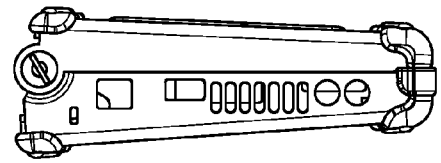
Fig. 13I                    Fig. 13J ically remove the computer from the case to use the computer and then place the computer back into the case.

Therefore, there is a need to provide a protective shell, portable mounting devices, or both for portable electronic devices.

ARTICULATED NOTEBOOK COMPUTER COVER AND MOUNTING DEVICE

CROSS-REFERENCE TO RELATED APPLICATIONS

This patent application claims the benefit of U.S. provisional patent application 61/192,679, filed Sep. 19, 2008, which is incorporated by reference along with all other references cited in this application.

BACKGROUND OF THE INVENTION

The present invention relates to protective cases or shells, and more specifically, to a protective shell for netbook or notebook computers, mounting devices for netbook and notebook computers, and manufacturing techniques for the protective shell.

The information age is upon us. Computers and computer networks can provide near instant access to information—regardless of geographic location. In the past, such information would have been difficult or even impossible to find. Computers are now used in many different industries such as commercial, retail, industrial, transportation, military, government, and law enforcement—just to name a few examples.

Portable electronic devices such as netbook computers, notebook computers, laptop computers, cell phones, smart phones, personal digital assistants, and so forth have become increasingly important in today's information age. The mobility of products such as portable computers allow people to have quick access to their files, update their files, receive up-to-date information, and send information regardless of where the person may be. These products, because of their portability, can accompany people as they travel and provide them with immediate access to information.

However, despite the portability of netbooks and notebook computers, operating such devices outside the home or office remains challenging. The benefits of being able to use a computer outside the home or office has yet to be fully realized. For example, netbook and notebook computers, while portable, are designed to be operated while placed on a flat, stable surface in front of a user. However, the location in which the user desires to use the portable computer may not have a desk, table, and chair. For example, while a portable computer can be taken into a vehicle (e.g., car or automobile), it will be difficult to actually use the computer because of the lack of easily accessible, flat, and stable surfaces within the confines of the vehicle.

Further, even if it is possible to place a desk or kiosk at the desired location, such structures are typically designed to be permanent or semipermanent—requiring space, and time to erect and disassemble. Thus, many potential computing environments are not currently utilized because the computer must be attached to or placed on something to become stable.

Further, the computer may not be well enough protected to become useful. Although there are carrying cases designed for portable computers, many of these carrying cases do not permit the computer to be easily used while in the case. That is, such cases are simply designed to transport the computer from one location to another location. Typically, the computer must first be removed from the case in order to use the computer. This can be a very difficult and awkward procedure to perform while not sitting at a desk or table. If the user is in a confined space (e.g., sitting in an airplane) there may not be a convenient place to store the case while the computer is being used. It can be burdensome and time-consuming to have to constantly remove the computer from the case to use the computer and then place the computer back into the case.

BRIEF SUMMARY OF THE INVENTION

A protective shell for a portable computer includes an upper shell and a lower shell connected via hinges. The computer can be placed into the shell by slipping a first hinged section of the computer underneath a first clip of the upper shell and then bending back a second clip, made of a resilient material, of the lower shell to allow a second hinged section of the computer to slip into the lower shell. The hinges are positioned on the protective shell so that they will be concentric or approximately concentric with a hinge of the portable computer when the protective shell encases the portable computer. A mounting plate may be removably attached to the shell to allow the shell to be connected to various mounting arm assemblies.

In a specific implementation, the present invention includes an articulated computer case (i.e., shell, protective shell, cover, or protective cover) for a portable electronic device such as a netbook or notebook computer. In a specific implementation, a detachable mounting device is included so that the case can be mounted inside a vehicle (e.g., car, automobile, bus, van, truck, boat, plane, helicopter, or train). In a specific implementation, a method allows for mounting a notebook computer to a surface while allowing the computer to remain fully operational.

For example, the protective shell encasing the computer can be mounted or clamped to a piece of furniture such as the edge of a desk, table, or counter. The mounting device, protective shell, or both may include a lock to help prevent the computer from being stolen. Thus, the mounting device, shell, and computer may be placed in a public area such as a post office, library, department store, or building lobby. Regardless of whether the computer is in a mounted or non-mounted configuration, the computer can remain fully operational while encased in the shell. Use of the word shell may be used in this application to distinguish the invention from notebook computer cases which serve simply as a mean of enclosure.

The protective shell can encase a portable computing device such as notebook computer. In a specific implementation, means are provided to attach the computer to a quick release mount mechanism that can be securely attached to most any surface.

Some specific benefits of the invention include:

(1) A system of parts to quickly and easily attach a notebook computer to a surface such that the computer can be securely maneuvered to achieve good or optimal positioning with numerous settings possible.

(2) Significant corner impact, surface abrasion, and fall protection.

(3) The capability for the computer to remain fully operational within the protective shell in either a mounted or non-mounted configuration. Alternatively, the computer and shell may be released from the mount and folded closed for transportation or storage.

Although there are other protective cases to contain a notebook computer for transportation and storage, a feature of this invention includes better access for use of the computer while within the enclosure by rotating the exterior shell along with the computer screen. Such rotation is made possible in the design by careful alignment of the shell hinge axis with that of the computer itself.

Notches and slots in the external shell provide tailored access to computer functionality. The invention also allows the shell with computer to be quickly mounted and put to use with a fully detachable mounting device. The shell and mount system provides not only structural protection from corner impact and surface abrasion, but also fall protection in a wide variety of functional settings while mounted. Quick release functions and full mounting plate detachability allow the shell with computer to remain more compact and free of external attachments during transportation and conventional tabletop use.

In a specific implementation, a device for protecting a portable computer includes first and second shells. The shells are hingedly connected together by a first hinge and a second hinge, opposite the first hinge. Each shell defines an interior space. A first clip extends from a sidewall of the first shell and over a portion of the interior space of the first shell. A second clip, including a resilient material, extends from a sidewall of the second shell and over a portion of the interior space of the second shell. A portion of a first hinged section of the portable computer can be inserted underneath the first clip and a portion of the second clip is capable of being resiliently bent to allow a second hinged section of the portable computer to slip past the resiliently bent portion of the second clip and into the interior space of the second shell. The hinges may be approximately coaxial with a hinge of the portable computer.

The second clip may include an elastomer. The device may further include a third clip, including the resilient material. The second clip can be at a first corner of the second shell, opposite the first hinge, and the third clip can be at a second corner of the second shell, opposite the second hinge.

In various implementations, the resilient material is deformable by a user. The second clip is formed as a part separate from the second shell. The first clip includes metal and the second clip includes rubber. The first clip is made of a material different from the second clip. The second clip may cover a top corner of the second shell and a bottom corner, opposite the top corner, of the second shell.

In a specific implementation, the device further includes a mounting assembly, removably connected to the second shell. The mounting assembly includes a mounting plate having a hook to hook onto a slot on a bottom surface of the second shell, and a bolt, passing through a hole in the mounting plate, and having threads to threadably engage with a threaded hole on the bottom surface of the second shell. There is a ball connected to the mounting plate. There is also a rod. The ball is received in a socket at an end of the rod.

The device may further include a set of foam strips, where at least one foam strip is connected to an interior surface of the first shell and at least one of another foam strip is connected to an interior surface of the second shell.

In a specific implementation, a device includes a protective shell for a portable computer. The shell includes first and second shell parts. Each shell part is made of metal. The shell parts are hingedly connected together by a first hinge and a second hinge, opposite the first hinge. Each shell part defines an interior space. A flange is formed from a sidewall of the first shell part. The flange extends from the sidewall of the first shell part and over a portion of the interior space of the first shell part. There is a first foam strip connected to an interior surface of the first shell part. The flange overlaps a portion of the first foam strip. There is a second foam strip connected to the interior surface of the first shell part. The second foam strip is closer to the first and second hinges than the first foam strip.

The device further includes first and second corner caps, each made of rubber. A portion of each corner cap extends over a portion of the interior space of the second shell part. The first corner cap is connected to a first top corner of the second shell part. The second corner cap is connected to a second top corner of the second shell part, opposite the first top corner.

After a portion of a first hinged section of the portable computer is inserted between the first flange and the first foam strip, the portion of each corner cap is bent to allow a second hinged section of the portable computer to be placed into the interior space of the second shell. When the first shell part is pivoted away from the second shell part, the first hinged section of the portable computer pivots with the first shell part.

The device further includes a mounting assembly. The mounting assembly includes a first mounting plate including a hook for hooking a slot on a bottom surface of the second shell part, a first mounting ball, connected to the first mounting plate, and a shaft including a first socket at an end of the shaft to receive the first mounting ball. A screw can pass through the mounting plate and be received by a fastener embedded in the second shell part. The fastener does not extend past the bottom surface of the second shell part.

The shaft may include a second socket at an opposite end of the shaft to receive a second mounting ball. The device may include a second mounting plate connected to the second mounting ball. 15. The device may include a clamp connected to the second mounting ball.

In a specific implementation, a method includes measuring a portable computer to determine information indicating an axis about which first and second sections of the portable computer rotate, using the information, modifying a generic template file to create a specific template file, providing the specific template file to a computer numerical control (CNC) machine to form first and second shells for the portable computer, and hingedly connecting the first and second shells. The portable computer can be encased by the first and second shells while the first and second shells are hingedly coupled.

The specific template file may include information indicating a distance from the axis to a sidewall of the first shell. The sidewall may extend in a direction parallel to the axis. The specific template file may include information indicating a distance from the axis to a keyboard of the second section of the portable computer.

The method may further include attaching a clip including rubber to the second shell, where a portion of the clip overlaps a portion of an opening of the second shell defined by sidewalls of the second shell. The portable computer can be removed from the first and second shells while the first and second shells are hingedly connected.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 13A-13J shows comparative side views showing ten shell profiles.

DETAILED DESCRIPTION OF THE INVENTION

Figure 1:
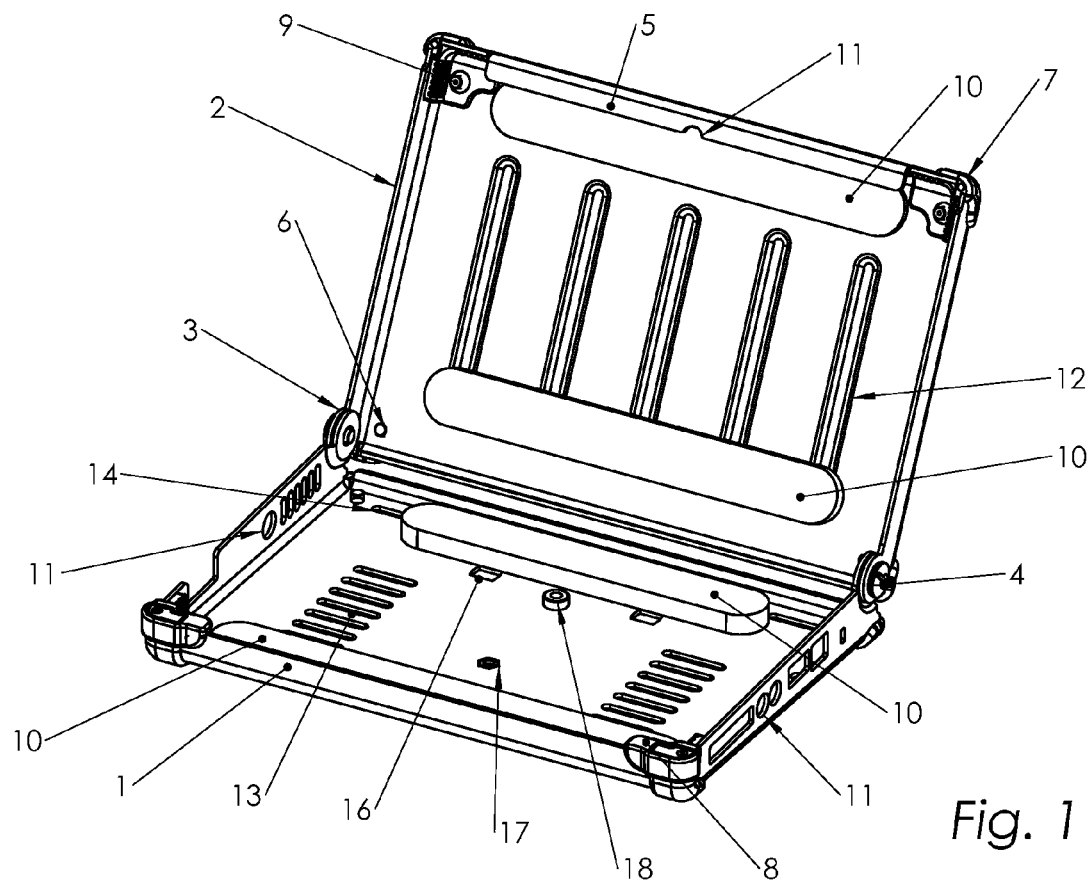
FIG. 1 shows a three-dimensional view of the computer shell fabrication.

FIG. 1 shows a perspective view of a specific implementation of a protective shell for a portable electronic device. The figure shows the protective shell in an open position. This protective shell can be used with portable electronic devices that have a flip or clamshell form factor or design. Typically, in such a design two or more sections of the electronic device fold via a hinge. For example, a first section of the electronic device is hingedly connected to a second section of the electronic device. This allows the electronic device to fold close and flip open. The first section of the electronic device may include a display. The second section of the electronic device may include a keyboard.

In a specific implementation, the protective shell is used to encase a notebook or netbook computer. Generally, a netbook computer is smaller and lighter than a notebook computer. A netbook, though having a hard drive, typically will not have a built-in optical drive (e.g., compact disc or digital video disc drive).

However, the protective shell can be used to encase any electronic device having a clamshell form factor, such as laptops, cell phones, mobile phones, smart phones, personal digital assistants (PDAs), subnotebooks, audio players (e.g., MP3 players), handheld video game consoles, portable digital video disc (DVD) players, and so forth. Further, the protective shell may be used to encase nonelectronic devices having a clamshell form factor.

Some features of the invention include:

1) A hard case or shell split into lower 1 and upper 2 halves joined by two hinge pivots 4 placed in a coaxial relationship with the computer screen rotational axis. See FIGS. 1-2 and 5.

2) Soft protective outside corners 7, front corner caps 8, and inside corner pads 9 integrate the shell shape, retain the computer base 21 and screen 22 within, and serve as contact bumpers. See FIGS. 1-4 and 6.

3) Cut-outs 11 provide functional access to ports, sockets, and other features that allow the user to operate the computer from within the shell. See FIGS. 1-4.

4) Ventilation slots 13 allow air to pass in for cooling the computer while in use. See FIG. 1.

5) Shell hinge components join and upper and lower shell halves in a pivot relationship. See FIG. 5.

6) Detachable mounting plate 33 mates with shell mounting slots 16 and self-retracting captive screw 37. See FIGS. 1, 7-9, and 11.

7) A mounting ball 36 and mounting socket 38 provide a means to connect the mounting plate 33 with a variety of adjustable arms 43 or other similar devices used to attach the computer and shell mounting system to various objects or surfaces. See FIGS. 11 and 13.

As one of skill in the art would recognize, the various concepts, ideas, functions, features, and operations of a computer shell as described in this application can be applied to any computer having any dimension, i.e., the size and specific shape of the shell can be varied to fit dimensional requirements of various computer models. Generally, the precise size and functional layout of notebook computers are not the same from one model and manufacturer to the next. The relationship is analogous to shoes fitting feet of different sizes and shapes. However, one of skill in the art will recognize that the dimensions of this computer shell can be modified to fit the size (e.g., dimensional requirements) and shape of a specific computer model.

Figure 3:
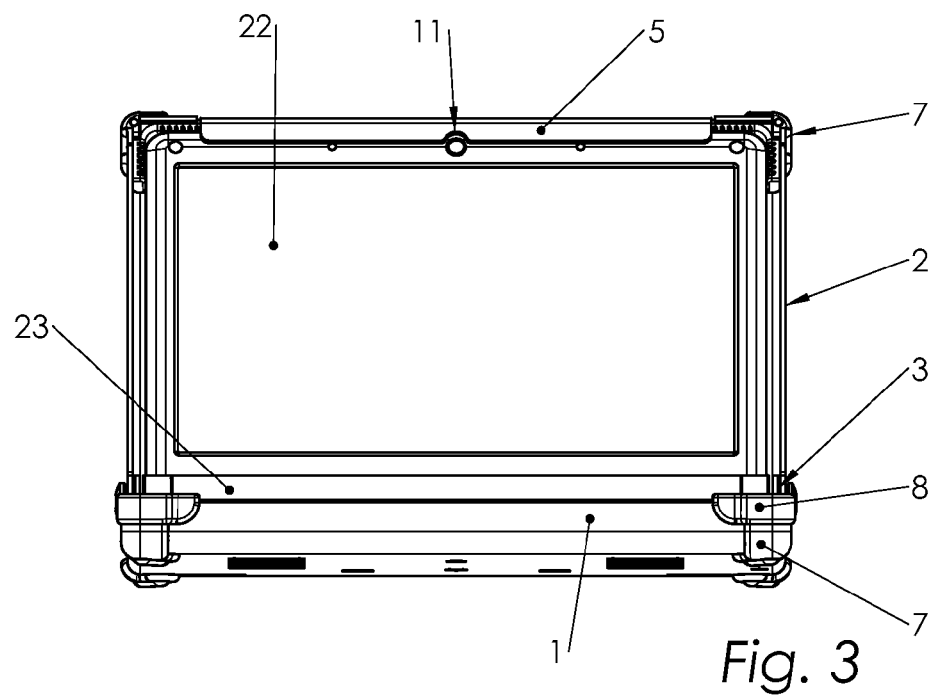
FIG. 3 shows a front view of the shell with a computer in the shell.
Figure 4:
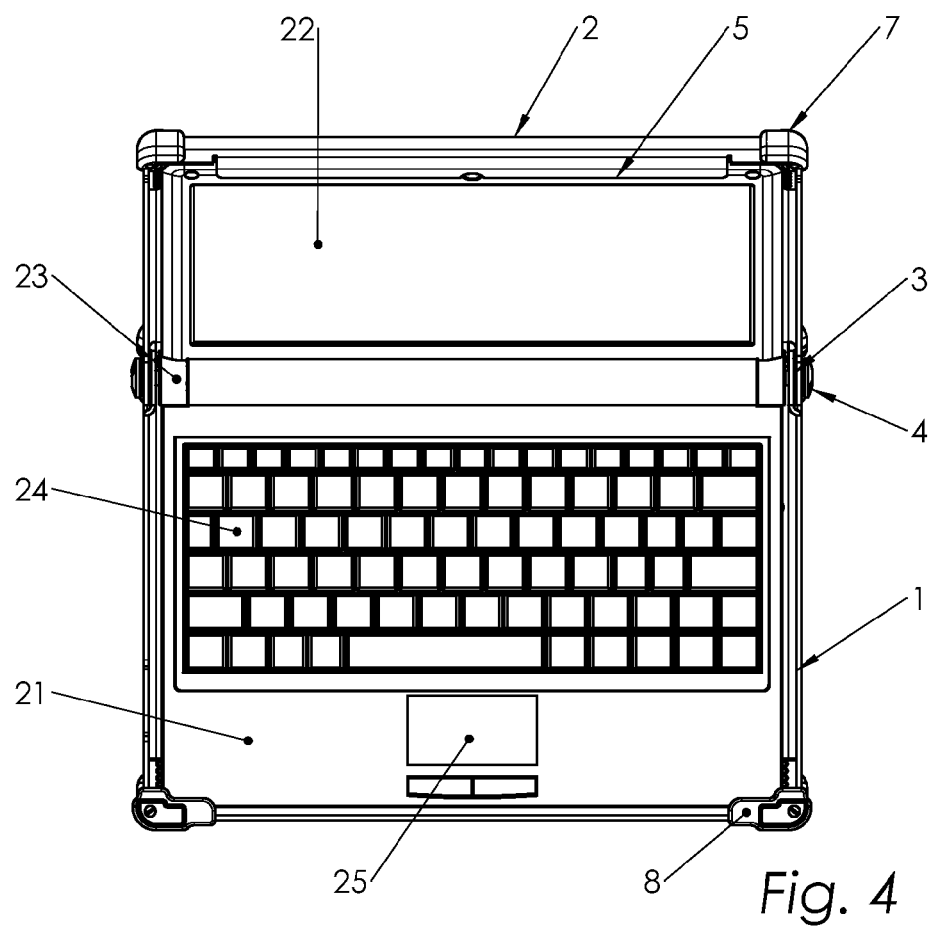
FIG. 4 shows a top view of the shell with the computer in the shell.

Typically, this protective shell is used with a netbook, notebook, or laptop computer that has a screen 22 and keyboard 24 arranged in a clamshell relationship as depicted in FIGS. 3-4. FIG. 13 illustrates ten shell profiles showing a range of computer model applications. It can be seen in these examples that the size of the shell lower 1 and shell upper 2 vary with the size of the computer for which they are designed. It can also be seen that the pattern, size, and number of shell cut-outs changes with each example. The hinge pivot bolt 4 locations are of special interest. These elements move in each case to align axially with the hinge axis of the computer model each shell pair fits.

The components of the invention may be assembled and used in a specific manner as described below. Fabrication and construction of these components may be achieved using ordinary machine tool arts, molds, and generic manufacturing materials such as plastics and metals along with available manufactured items.

In a specific implementation, the protective shell may be referred to as the Minimount™ case for netbooks. This case is a hard shell enclosure with rugged functional protection, and multiple mounting features in a single versatile product. Its uniquely designed clamshell case opens and closes with the notebook screen providing full functionality while the computer remains securely cushioned within. The all aluminum shell with quick connect mounting features may be attached to most any surface or vehicle using a wide range of compatible products, including photographic tripods, vehicle arms, and various surface attachments. Selecting from these available mounting platforms, most any busy environment, vehicle, or work surface can become an instant mobile computing environment.

The Minimount™ is designed to make highly affordable, compact, wireless netbook computing both convenient and secure in settings that demand creative mounting solutions.

Some features of the case include:

1) Formed aluminum shell combines maximum strength with lightweight quality.

2) Laser cut template design custom fits Minimount™ case profile and features to each supported computer model.

3) Concentric hinge design opens and closes with the netbook computer.

4) Synthetic rubber corners soften hard edges and protect contact surfaces.

5) Durable foam pads cushion internally while snugly supporting computer within the Minimount™ case enclosure.

The protective shell includes a lower or bottom shell 1 connected via hinges to an upper or top shell 2. The shell further includes foam pads 10, cutouts 11, and corner caps 7 and 8, In this specific implementation, the hinges are formed at opposite ends or sides of the shell (i.e., left-hand side and right-hand side). There is a first hinge at a first end or side of the shell and a second hinge, opposite the first hinge, at a second end or side of the shell.

Figure 5:
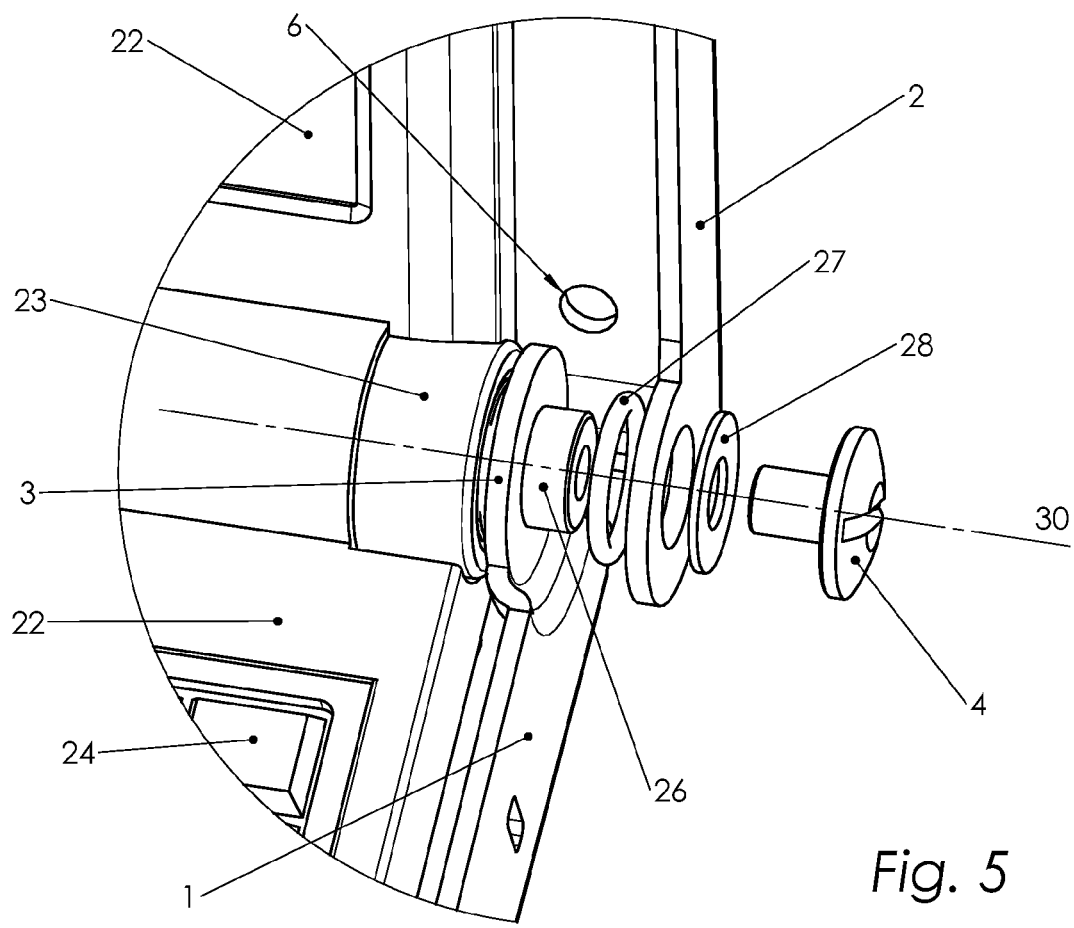
FIG. 5 shows a three-dimensional, exploded hinge assembly detail view.

FIG. 5 shows an exploded view of a specific implementation of a hinge. In this specific implementation, a hinge ear 3 is formed into the lower shell on right and left sides in a coaxial relationship to a computer's hinge 23 (FIG. 3). A user having a computer can purchase the protective shell and fit the computer within the shell. A clenched fastener 26 or internally threaded fastener is pressed in place within each hinge ear of the lower shell.

An example of an internally threaded fastener that can be used with this hinge is a PEM® nut or fastener. The PEM® nut is produced by PennEngineering, located in Danboro, Pa. In a specific implementation, the nut is pressed into a close fitting hole in the sheet metal. The nut itself is harder than the material it is being pressed into. A tapered ring cut into the nut profile is forced downward on the hole edge and causes material from the sheet metal to deform, thus filling the grooved ring around the nut. The shape of this groove and a knurled pattern or hexagonal nut shape help to resist both rotational and pull out forces. In this specific implementation, the hinge nuts are applied backwards from their intended application in relation to the hinge bolt. The two nuts used for mounting on the base are correctly applied in relation to their fastening strength.

A corresponding hinge ear is formed into the upper shell. The corresponding hinge ear has a hole to receive fastener 26. The hinge is assembled by mating the hinge ear formed in the lower shell with the corresponding hinge ear formed in the upper shell. That is, after the fastener has been installed in the hinge ear of the lower shell, the shaft of the fastener and the hole in the corresponding hinge ear are aligned. The shaft of the fastener can then pass into the hole in the corresponding hinge ear. An O-ring 27 fits between the hinge ear 3 in the lower shell and the corresponding hinge hear formed in upper shell 2. The O-ring acts as a compressible spacer, centering the two halves and dampening the pivoting action at the hinge. Ball bearings may be included between the hinge ear and corresponding hinge ear to facilitate pivoting action.

A hinge pivot bolt 4, protected by a washer 28 (e.g., nylon washer), is screwed in place through the threaded holes on each clenched fastener to contain the assembly (i.e., secure the upper and lower shells) and allow the upper shell 2 to rotate, opening and closing along with the computer screen when the user places the computer in the protective shell. The hinge pivot bolt may be referred to as a rod, shaft, axel, pin, or dowel.

These fasteners serve as a pivot surface on which the upper shell rotates by means of a matching hole penetration on each side. In a specific implementation, the fasteners have internal threads which engage with external threads on the hinge pivot bolt. In this specific implementation, the fasteners have a threaded hole passing completely through.

Typically, the screws are fully torque against the nylon washer which has a small hole, slightly larger than the screw shaft diameter. This pinches the washer tightly between the PEM nut face and the underside of the screw head. Generally, if the hinge bolt is left loose, or modestly so, the lid rotation acts on the screw and ether tightens or loosens it as movement occurs. This is undesirable because the screw can fall out. The thickness of the O-ring and the addition of a light coating of silicon grease can create a modest degree of tension. The grease can also promote the durability of the O-ring. The addition of a very thin fiber washer can also add tension to a loose fitting lid or upper shell.

In a specific implementation, a user can replace one or more parts of the hinge if these parts wear out. As shown in FIG. 5, the hinge pivot bolt is easily accessible, i.e., the shell does not have to be disassembled in order to access the hinge pivot bolt. The hinge pivot bolt can be unscrewed by, for example, fitting a screwdriver or coin (e.g., a quarter) in the slot at the head of the bolt. The bolt can then be turned (e.g., counterclockwise) to disassemble the hinge. The O-ring which helps to dampen the pivoting action can be easily and inexpensively replaced.

Another benefit is that this shell can be used to help restore computers having hinges that are worn or broken. The displays in these computers may not stay open and may unexpectedly flop backwards or forwards such as when the user releases their hand from the display or picks the computer up. The user, instead of having to disassemble the computer and purchase what can be an expensive and difficult to locate replacement part can simply purchase a shell as described in this application. The hinge of the shell can provide the necessary resistance to ensure that the display does not unexpectedly flop backwards or forwards. Additionally, the shell can help protect the computer.

As shown in FIG. 5, hinge ear 3 may be offset from a surface (e.g., external surface) of the lower shell. The offset may be about the thickness of the corresponding hinge ear. The offset may be about the thickness of the corresponding hinge ear plus the thickness of the O-ring. The offset or distance between the surface of the lower shell and the hinge ear may be about 3 millimeters, but may range from about 1 millimeter to about 10 millimeters. This includes, for example, 2, 4, 5, 6, 7, 8, 9, or 9.9 millimeters, or more than 10 millimeters. The offset may be less than 1 millimeter. The corresponding hinge ear may instead or additionally be offset. The offset allows the sidewalls of the lower and upper shells to be flush when closed.

In other implementations, other similar and equivalent elements and functions may be used or substituted in place of or used in combination with what is shown. For example, the O-ring may be replaced with a gasket, bushing, or washer.

Examples of hinge types that may be used to connect the lower and upper shells include a center or pivot hinge, strap hinge, reversible or double-folding hinge, nonreversible hinge, back flap hinge, card table hinge, rising butt hinge, continuous or piano hinge, flush hinge, double action hinge, and friction hinge. A hinge mechanism may include one or more linkages such as a four-bar linkage (e.g., drag-link, crank-rocker, double-rocker, grashof, or parallelogram linkage), a five-bar linkage, a six-bar linkage, or crank-slider. These linkages can provide one or more degrees of freedom or mobility (e.g., rotation and translation) so that the display can be opened with the upper shell. A hinge may be located on a back or rear side of the shell.

Figure 2:
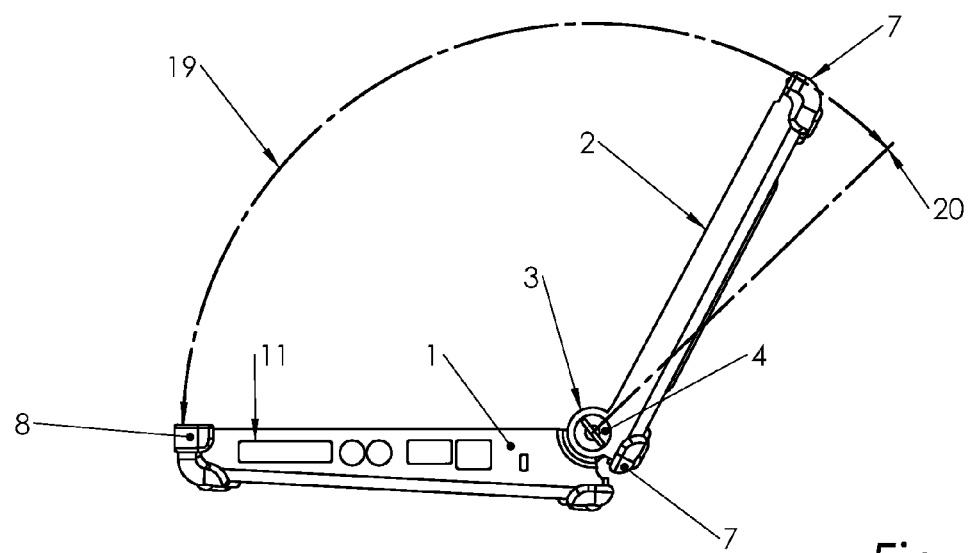
FIG. 2 shows a right-hand side view of the shell including range of movement.

FIG. 2 shows a side view of the assembled upper and lower shells. The geometric relationship between the computer hinge and the shell hinge permits comfortable operation of the computer while it is securely retained within the articulated shell. This motion is facilitated by a coaxial relationship of the upper shell along the hinge axis of the computer. As shown in FIG. 2, there is a path of rotation 19 and limit of rotation 20. This demonstrates the operational range of the upper computer shell, which may vary from one computer model to another.

In a specific implementation, the limit of rotation of the upper and lower shells is designed to be less than the limit of rotation of the computer keyboard and display or computer hinge. The limit of rotation of the shells may be about 1 degree or about 2 degrees less than the limit of rotation of the computer hinge. For example, if the display can be rotated 135 degrees, the upper shell which receives the display can rotate about 134 degrees (i.e., 135 degrees minus 1 degree is 134 degrees) or about 133 degrees (i.e., 135 degrees minus 2 degrees is 133 degrees). The limit of rotation of the shells may range from about 0.5 degrees to about 5 degrees less than the limit of rotation of the computer hinge. This includes, for example, 0.6, 0.7, 0.8, 0.9, 1, 1.1, 1.2, 1.3, 1.4, 1.5, 1.6, 1.7, 1.8, 1.9, 2.1, 2.2, 2.3, 2.4, 2.5, 2.6, 2.7, 2.8, 2.9, 3, 4, 4.9 degrees, or more than 5 degrees. The limit of rotation of the shells may be less than 0.5 degrees of the limit of rotation of the computer hinge.

The shell hinges are typically stronger than the computer hinge. Therefore, if the rotational limit of the case is reached with a force strong enough to otherwise break the computer, it will still not break because the hinge structure of the case is stronger by comparison. This condition is beneficial to the user as long as the rotational limitation is not significant enough to be easily noticed, or impair functionality. In other words, the shell hinges act as a stop to prevent the user from over rotating the computer hinge or display.

In another implementation, the limit of rotation of the shells is at least about the same as the limit of rotation of the computer encased by the upper and lower shells. For example, if the display can be rotated 135 degrees, the upper shell which receives the display can rotate at least about 135 degrees. If the display can rotate 180 degrees, the upper shell can rotate at least about 180 degrees.

The computer screen or display and upper shell may be freely rotated together by the user once the computer is contained and secure within the shell. That is, the user can grasp a portion of the upper shell, rotate, pivot, or swing the upper shell away from the lower shell, and the computer display will swing open. In a specific implementation, the user does not have to separately open the display or touch the display because flange 5 (FIG. 1) of the upper shell hooks the display as the upper shell is pivoted away from the lower shell.

The user can grasp the portion of the upper shell, swing the upper shell towards the lower shell, and the computer display will swing close towards the base of the computer. In a specific implementation, when the shell is in an open position, an angle between the keyboard of the computer and the display is the same as an angle between the lower shell and the upper shell.

Figure 10:
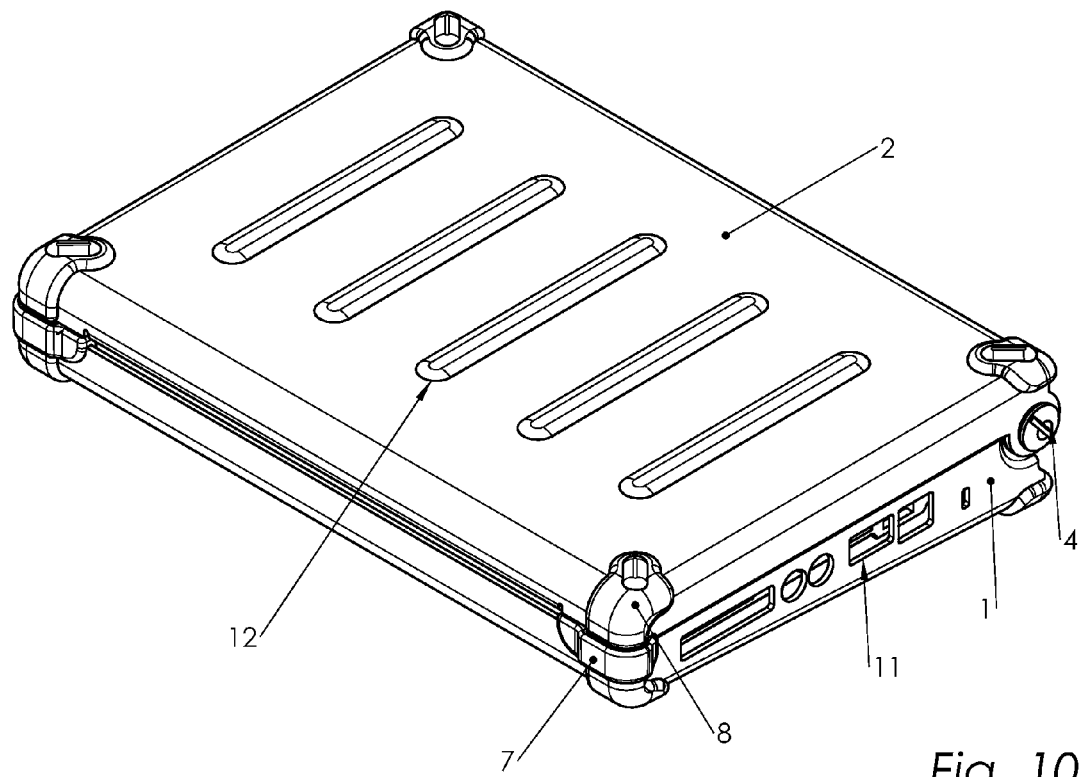
FIG. 10 shows an isometric view of the shell in a closed state.

In the closed position, as shown in FIG. 10, the computer remains securely enclosed in a compact state for transportation and storage. When opened by the user there remains a flexible range of movement, similar to that of the original, unenclosed notebook computer suitable to position the screen and keyboard in a relationship to be viewed and operated efficiently.

As shown in FIG. 2, a footprint of the shell in the open position and closed position can remain the same. In this specific implementation, no portion of the upper shell touches a surface upon which the lower shell rests. This is desirable because the shell can be placed on a crowded or small surface (e.g., built-in tray table on commercial airplane). The shell can then be opened to access a computer fitted into the shell without having to reposition the shell and computer to a larger or less crowded surface. The molded corner elements can act as feet upon which the shell with computer rest thereby protecting delicate surfaces from abrasion.

In a specific implementation, the shell includes an upper or top shell for receiving the display of a computer, a lower or bottom shell for receiving a base of the computer, a first hinge, and a second hinge, opposite the first hinge. The first and second hinges pivotly or hingedly connect the top and bottom shells. When the shell receives or encases the computer a first axis passing through the first and second hinges is coincident or coincides with a second axis passing through a hinge connecting the base of the computer to the display of the computer. That is, the hinge of the computer and the first and second hinges of the shell are coaxial or approximately coaxial. The first axis passes through the first and second hinges of the shell and the hinge of the computer.

In this specific implementation, the first and second hinges are aligned with the hinge of the computer. More specifically, the first axis or axis about which the upper and lower shells rotate is aligned with the second axis or axis about which the display and keyboard rotate. This alignment allows the display of the computer to swing open and swing close with the opening and closing of the upper shell. Because of the alignment, the upper shell does not shift, slide, or translate relative to the display, the lower shell, or both as the computer is flipped opened and closed. Further, in this specific implementation, the hinges of the shell are rigid or permit a rotational movement of the upper and lower shells, but not a translational movement of the upper and lower shells.

In another implementation, the first axis or axis about which the upper and lower shells rotate is slightly offset with respect to the second axis or axis about which the display and keyboard rotate. The first axis may be parallel to the second axis, but may be slightly offset from the second axis. A distance or offset distance between the first and second axis may range from about 0.1 millimeters to about 5 millimeters. This includes, for example, 0.2, 0.3, 0.4, 0.5, 0.6, 0.7, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, or 4.9 millimeters, or more than 5 millimeters. The distance may be less than 0.1 millimeters. The first axis may be offset in any direction with respect to the second axis. For example, the first axis may be offset above, below, behind, or in front of the second axis.

This slight misalignment or unevenness can be used to create some friction or forces within the shell hinge, the computer hinge, or both to provide resistance or damping when the upper shell (and thus display) is pivoted away from the lower shell. This resistance or damping can help to prevent the user from over rotating the upper shell past a desired angle with respect to the lower shell. The upper shell can remain stationary after the user opens the upper shell to the desired angle.

The shell, computer, or both may or may not include a latch mechanism. In a specific implementation, the shell includes a soft closure device such as a strap having hook-and-loop fasteners (e.g., Velcro®) or an elastic strap that hooks over a button.

Referring now to FIG. 1, cutouts 11 in the computer shell along portions of its perimeter are matched in size, shape, or both to coincide with functional features of each computer. These patterned cutouts allow continued functionality of the computer while in the protective cover by providing access to computer features such as computer ports 39 (FIG. 11), universal serial bus (USB) ports, memory card slots, network cable sockets, power cables, ventilation slots, LED indicators, camera lenses, microphones, and other useful features a given computer model may offer that may be accommodated through similar cutouts.

The cutouts may be located anywhere on the shell. For example, the cutouts may be located on the upper shell, lower shell, or both. Generally, the location and size of the cutouts on the shell is based on the location and size of (i.e., aligned with) the various ports, jacks, slots, plugs, connectors, sockets, microphones, buttons, switches, indicator lights, camera, or combinations of these that a specific computer may have. The cutouts or openings in the shell expose these various components or options of the specific computer so that these components can be accessed by the user when the specific computer is enclosed by the shell.

For example, when the specific computer is in the shell, the user can insert a USB plug into a USB port of the computer by passing the USB plug through a cutout in the shell and into the USB port. That is, the user does not have to remove the computer from the shell to access the USB port.

As another example, a cutout can be used to provide ventilation while the computer is being used while encased in the shell. Typically, the cutouts are aligned with the ventilation slots of the computer. The cutout helps to ensure that the computer does not overheat and ruin, for example, the hard drive, processor, or memory of the computer.

One or more components or features of the computer can be accessed while the shell is closed. For example, while the shell is closed, the user can pass a DC power plug through a cutout in the shell and insert the DC power plug into a DC power socket of the computer. This allows the battery of the computer to be charged while the computer is encased within the shell.

In some computers, the DC power socket of computer is positioned on left-hand or right-hand side of the computer and nearer to a back side of the computer than a front side. Thus, a shell for these computers may have a cutout for the DC power plug positioned on a left-hand side or right-hand side of the shell. The cutout may be nearer to a back side of the shell or the shell hinges than a front side of the shell.

A cutout may provide access to one or more components of the computer. The cutouts can have any shape. A cutout can have the shape of a circle, rectangle, square, obround, triangle, or oval—just to name a few examples. The shape of a cutout may indicate, mirror, or resemble the shape of the component on the computer that the shell is designed for. For example, if a power jack on the computer has a circular shape, a cutout on the shell providing access to the power jack may likewise have a circular shape. If a USB port on the computer has a rectangular shape, a cutout providing access to the USB port may likewise have a rectangular shape.

By looking at the shape of the cutout, the user can identify what component of the computer can be accessed via the cutout. This allows the user to quickly insert a plug (e.g., USB plug, power plug, or microphone) into the proper cutout without having to resort to trial by error. Thus, a user having associated a circular cutout with a power plug and a rectangular cutout with a USB port, will typically not try to insert the power plug through the rectangular cutout and the USB plug through the circular cutout.

In various specific implementations, sidewalls of the upper shell do not have any cutouts. This may be the case where the display of the computer to be encased by the shell does not have components (e.g., ports or camera) to be accessed. In another implementation, the upper shell includes one or more cutouts. A sidewall of the lower shell may include at least one circular cutout to indicate, for example, access to a DC power socket. A sidewall in the lower shell may include a set of obround cutouts oriented or extending vertically to indicate, for example, ventilation slots. A sidewall in the lower shell may include at least one rectangular cutout to indicate, for example, access to a USB port. The sidewall may be on any side or end of the shell (e.g., left-hand side, right-hand side, front side, or backside).

The shell can have any number of cutouts. In a specific implementation, the lower shell has 16 cutouts. However, the number of cutouts can range from about 1 cutout to about 30 cutouts depending upon the number of components of the specific computer that the shell is designed for. A shell may have no cutouts. For example, if the display of the specific computer does not have any ports or other features that need to be exposed the upper shell may not have any cutouts.

The shell may be supplied with plugs that the user can use to cover the cutouts when the cutouts are not being used. This helps to prevent dust, dirt, and other debris from entering the shell. The user can remove a plug from a cutout and place the plug back over the cutout. The plug may be attached to the shell (e.g., using a cable) so that the plug does not become lost when removed from the cutout.

The shell and its relationship to the computer are shown in FIGS. 1-4. The articulated computer shell is fabricated to wrap around the exterior of a typical notebook computer as snugly as possible while still allowing clearance for operation and removal of the computer itself. For example, a distance between an edge of the computer and the shell may be about 3 millimeters, but can range from about 1 millimeter to about 15 millimeters. This includes, for example, 2, 4, 5, 6, 7, 8, 9, 10, 11, 12, 13, 14, or 14.9 millimeters, or more than 15 millimeters. The distance can be less than 1 millimeter.

Thus, the exterior dimensions of the shell (i.e., length, width, and thickness) may be only slightly greater than the exterior dimensions of the computer. This is generally desirable because it helps to reduce the shell's bulkiness. A wall of a shell part (e.g., the lower shell) may have a height such that a top of the wall is aligned with or slightly above the base or display of the computer when the computer is placed in the shell. A distance from the base of the computer to the top of the wall (i.e., to a line resting on the tops of the left- and right-hand walls) may be about 0.5 millimeters, but may range from about 0.1 millimeter to about 5 millimeters. This includes, for example, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, or 4.9 millimeters, or more than 5 millimeters. The distance can be less than 0.1 millimeters.

In a specific implementation, the height of the lower shell wall is greater than the height of the upper shell wall. This implementation of the shell may be used with computers having a base with a thickness greater than a thickness of the display. However, depending on the computer that is to be placed in the shell, the height of the lower shell wall may be the same as the height of the upper shell wall. The height of the lower shell wall may be less than the height of the upper shell wall. The height of the back walls of the shells may be less than a height of the side walls of the shells, the front walls of the shells, or both.

Although FIGS. 3-6 and 12 show a computer within the shell, typically the computer is not included with the shell. The user purchases the shell and computer separately. The computer can be operated while not in the shell. In another implementation, the shell is included with the computer.

The lower shell enclosure 1 and upper shell enclosure 2 are cut, formed, or otherwise molded into a shape which allows a specific computer model to be cradled and retained securely within the enclosure. The computer is retained along its edges (e.g., front edges) at the base, screen, or both. Molded front corner caps 8 are shaped to provide contact through mild pressure and positive engagement with associated computer edges at the base 21. Upper retaining flange 5 is formed in the shell material to retain alignment of the computer screen 22 within the upper shell and is centered between a pair of inside corner pads 9. There are a number of soft foam pads 10 adhered within both the upper and lower shells. These pads vary in thickness and overall size to match the needs of each computer model. The pads not only cushion the computer to absorb shock, but also provide a compressed, spring-like action to hold the computer securely within the shell.

The foam pads position the computer away from the interior surfaces of the shell to help absorb shock. In this specific implementation, the surface (e.g., metal surface) of the shell does not directly touch the computer. Rather, the computer is suspended within the shell by the foam pads. In another implementation, at least a portion of the surface of the shell touches the computer.

The pads may include polyurethane foam (i.e., foam rubber), extruded polystyrene foam (XPS), polystyrene, syntactic foam, an elastomer (e.g., rubber), or be made of any other kind of material that has elastic, resilient, or compressible properties, or combinations of these properties to absorb shock and expand to hold the computer within the shell.

Referring now to FIG. 4, the split between the lower and upper shell is positioned approximately parallel with the plane of the computer keyboard 24. This position ensures comfortable use of the computer keyboard and touchpad when the shell is open.

Figure 6:
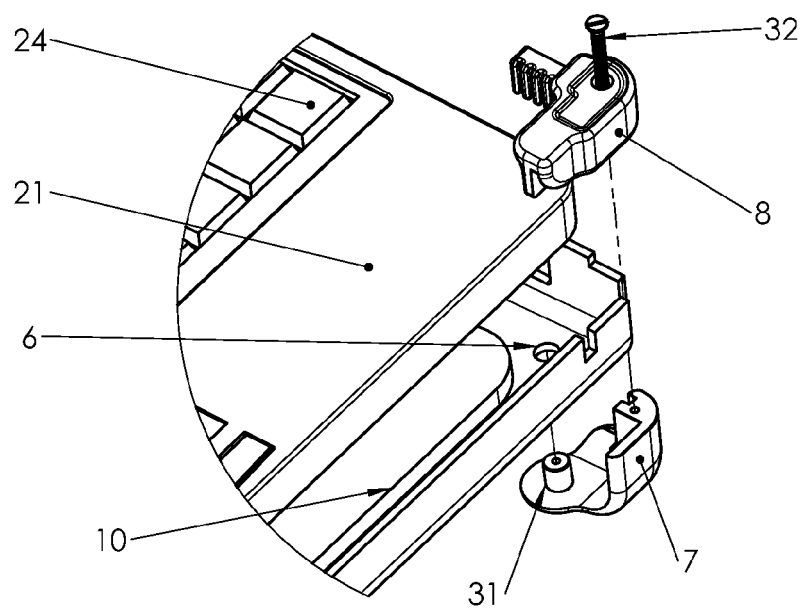
FIG. 6 shows a three-dimensional, exploded front corner detail view.

Outside molded corner cushions 7 are fit to and held in place at all four corners of both the upper and lower shells. Formed notches in the shell accept specific shapes at each corner location. For example, as shown in FIG. 6, in a specific implementation, each molded corner also has a post 31 which snaps into place through corner retention holes 6 located in the shell material at each corner. Front corner caps 8 fit over the outside molded corners at the two lower front locations as shown in FIG. 6. These caps are attached by means of a self-tapping screw 32 which passes through the cap and into the outside molded corner below.

The corner cushions may be made of an elastomer such as rubber to help cushion the shell and thus computer from impact.

Referring now to FIG. 1, a flow to encase the computer within the shell may be as follows:

1. Open the computer. For example, the display of the computer is flipped or swung open away from the base of the computer.
2. Place the upper screen or display edge of the computer under the shell upper retaining flange 5.
3. Rotate the computer base 1 into place (i.e., towards the hinges) so that it is resting on top of the molded front corner caps 8.
4. Push the computer base towards the upper shell so that the foam pads on the upper shell are compressed so that a front edge of the base can slip below the projecting edge of the front corner caps.
5. Release the computer. The foam pads will then expand and push the computer away from the upper shell so that a portion of the base will be underneath the projecting edges of the front corner caps.

In other words, the computer is compressed slightly against the foam pads 10 until enough clearance is gained to snap the front edge of the computer base 21 past the front corner caps and then released. As such the computer is held securely within the shell. The upper and lower shells do not have to be disconnected in order to place the computer into the shell. That is, the upper and lower shells can remain hingedly connected while the computer is being placed in the shell.

To remove, the computer is once again slightly compressed against the foam pads and the front edge of the base of the computer is moved up and over the front corner caps. This simple process is facilitated by closely matching the shell sizes and foam pad thickness with each computer model to ensure proper fit. The upper and lower shells do not have to be disconnected in order to remove the computer from the shell. That is, the upper and lower shells can remain hingedly connected while the computer is being removed from the shell.

In a specific implementation, a protective shell includes first and second shells (e.g., upper and lower shell). The shells are hingedly connected by a first hinge and a second hinge, opposite the first hinge. Each shell defines an interior space. For example, the interior space of the first shell may be defined by left, right, front, and back sidewalls. The left and right sidewalls are parallel and are opposite each other. The front and back sidewalls extend between the left and right sidewalls. The front and back sidewalls are parallel and are opposite each other.

In this specific implementation, a first clip extends from a sidewall of the first shell and over a portion of the interior space of the first shell. The first clip may be formed from a front sidewall of the first shell (i.e., the sidewall opposite or furthest away from the hinges) as shown in the example of flange 5 in FIG. 1. However, the first clip can be located on any sidewall of the first shell. In this specific implementation, the flange or first clip is formed as an integral part of the first shell. The first clip is made of the same material (e.g., metal) as the first shell and thus has the same modulus of elasticity as the material of the first shell. In another implementation, the first clip may be formed as a piece that is separate from the first shell. For example, the clip may be formed as a separate bracket or clamp that holds the first shell and a first hinged section of the portable computer together.

A second clip (or a portion of the second clip) extends from a sidewall of the second shell and over a portion of the interior space of the second shell. In this specific implementation, the second clip is shown as front corner cap 8 (FIG. 1). The front corner cap covers a top and bottom corner of the second or lower shell. Although the second clip is shown attached to a corner of the second shell, a clip may instead or additionally be attached to the shell between corners of the shell. A clip may be attached to the shell between a corner of the shell and a hinge of the shell. A corner cap may cover a corner (e.g., top corner) of the second shell while leaving another corner (e.g., bottom corner) uncovered.

In this specific implementation, the second clip is made of or includes a material that is deformable or resiliently deformable by the user. The material may be, for example, an elastomer, thermoplastic elastomer, rubber, plastic, or silicon rubber. The modulus of elasticity for the material may range from about 0.01 to about 0.1 newtons per meter squared ($N/m^2$). Generally, any material which allows the user to bend or flex the material without permanently deforming the material can be used. That is, the second clip or front corner cap may be made of a material with resilient and compressible properties so that the corner caps can be pried while inserting the computer into the shell, removing the computer from the shell, or both. Once the corner caps are released, they can spring back into their original shapes.

In a specific implementation, the second clip extends a distance of about 6 millimeters from an inside surface of the sidewall of the shell. However, the distance can range from about 2 millimeters to about 10 millimeters. This includes, for example, 2.5, 3, 3.5, 4, 4.5, 5, 5.5, 6.5, 7, 7.5, 8, 8.5, 9, 9.5, or 9.9 millimeters or more than 10 millimeters. The distance may be less than 2 millimeters.

In various implementations, a clip to hold a first hinged section of a portable computer and the first shell together, and another clip to hold a second hinged section of the portable computer together are made from different materials or have different elastic properties (e.g., rigid versus flexible). In a specific implementation, at least one clip is made of a resilient material such as rubber. Both clips may be made of the resilient material. In another implementation, both clips may be made of a rigid or non-resilient material (e.g., metal). Both clips may be made as pieces that are separate from the shells (e.g., brackets or clamps).

In another implementation, a clip includes one or more springs that urge a part of clip over the interior space of the shell. The user can bend the part of the clip back, against the force of the spring in order to place the computer into the shell. In another implementation, a clip is designed to be bent back and forth by a user (e.g., thin piece of metal) so that the user can insert and remove the computer from the shell.

Referring now to FIG. 1, in a specific implementation, the upper shell includes a left sidewall, a right sidewall, opposite the left sidewall, and a top or front sidewall. The upper shell may further include a bottom or rear sidewall, opposite the top or front sidewall. These sidewalls define a first opening through which the display of the computer will be visible.

The upper shell further includes a retaining mechanism so that the display can rotate with the upper shell. The retaining mechanism can be any device that clips, grips, claps, or hooks the display as the upper shell pivots away from the lower shell. In this specific implementation, the retaining mechanism is provided by flange 5. The flange extends from a sidewall, such as the top sidewall, so that it at least partially overlaps the first opening of the upper shell through which the display will be visible. Although FIG. 1 shows the flange extending away from the top sidewall, the flange may extend from any sidewall. Further, there can be any number of flanges.

In this specific implementation, the retaining mechanism (i.e., flange) is formed by bending a portion of a sidewall, i.e., the top sidewall. That is, the retaining mechanism is an integral part of the upper shell. However, the retaining mechanism may instead or additionally be one or more separate pieces. For example, the retaining mechanism may be a clip or bracket that clamps the display and the upper shell together.

In this specific implementation, no parts of the shell require removal when placing the computer into the shell and removing the computer from the shell. For example, the front corner caps do not have to be removed and no tools (e.g., screwdrivers or wrenches) need to be used. This allows the computer to be quickly and easily placed into the shell and removed from the shell.

In another implementation, one or more parts of the shell require removal when placing the computer into the shell, removing the computer from the shell, or both. This specific implementation may be used when there is a possibility that someone will try to steal the computer from the shell such as when the shell and computer is placed in a public location. The foam pads may be replaced with components that are less compressible to prevent a would-be thief from removing the computer by slipping the front edge of the computer base over the projecting edge of the front corner caps. Further, the front corner caps may be secured to the shell using tamper-resistant screws to prevent the would-be thief from removing the corner caps. The computer may be further secured using locks, clamps, and the like.

Depending upon the user's preference, the user can use the protective shell as a carrying case for transporting the computer, use the computer while the computer is in the shell, or remove the computer from the protective shell. The user may choose to do the latter if the user is inside an office building and perhaps will be moving only from one office room to another office or conference room and does not want the additional weight of the protective shell.

Alternatively, the user may choose to remove the computer from one protective shell (i.e., a first protective shell) and encase the computer in another protective shell (i.e., a second protective shell). The first shell may be designed as a lightweight shell for use in relatively benign conditions such as casual business travel. The second shell may be designed for use in extreme conditions where the shell is likely to be subject to more shock and impact as compared to the benign conditions. The second shell, as compared to the first shell, may have a thicker shell, thicker padding, additional padding, be made of a more durable material, and so forth. The first shell, as compared to the second shell may be lighter and have a slimmer profile. Thus, depending upon the user's changing needs, the user can easily switch between different shells and use the same computer.

While certain manufacturers have built their computer housings to have varying degrees of impact protection, these housings are not removable. Rather, the various parts of the computer (e.g., hard drive, processor, keyboard, and display) are attached to and built into the housing. The housing is integrated with these parts to form a single unit. This design has many disadvantages. For example, if the user's work includes working in both benign and extreme conditions the user is faced with several options—none of which are desirable. A first option is for the user to purchase two computers—a computer designed for rugged conditions and another computer designed for semi-rugged conditions. For this option, the user needs to spend additional money to purchase the second computer and must be sure to carefully synchronize the information between the two computers. A second option is for the user to purchase the computer designed for rugged conditions. For this option, the user is forced to carry the additional and unnecessary weight of the computer while working in the relatively benign environment. A third option is for the user to purchase the computer designed for semi-rugged conditions. For this option, the user must accept the greater risk that the computer will be damaged when the user takes the computer into an extreme environment.

In contrast, the protective shell as described in this application allows the user to quickly and easily switch between different shells having different weights and offering different degrees of protection depending upon the user's changing needs.

In a specific implementation, the upper shell, lower shell, or both are formed from sheet metal. In this specific implementation, a thickness of the sheet metal is about 3 millimeters, but can range from about 1 millimeter to about 10 millimeters. This includes, for example, 1.5, 2, 2.5, 3.5, 4, 4.5, 5, 6, 7, 8, 9, or 9.9 millimeters, or more than 10 millimeters. The thickness can be less than 1 millimeter. Generally, a thicker shell can offer more protection as compared to a thinner shell. A thinner shell will be lighter as compared to a thicker shell.

In this specific implementation, the upper shell is formed from a first sheet metal. Portions of the first sheet metal are removed by, for example, cutting, stamping, drilling, or combinations of these to form first and second hinge members at opposite ends of the first sheet metal. The location of the hinge members is determined based on the location of the axis of the portable computer that will be encased by the upper and lower shells.

A first end of the first sheet metal is bent to form a left wall (e.g., bent about 90 degrees). A second end, opposite the first end, of the first sheet metal is bent to form a right wall. A third end, between the first and second ends, of the first sheet metal is bent to form a back wall. A fourth end, opposite the third end, of the first sheet metal is bent to form a front wall. Thus, the upper shell is formed as a panel with four sides and bordered or surrounded by the left, right, back, and front walls.

A portion of the front wall is bent towards the back wall to form a flange. The flange creates a pocket to receive a portion of a display of the computer. The flange can hook a portion of the display so that the display can swing open with the top shell. That is, when the upper shell receives the display, a portion of the display will be between the flange and a panel of the upper shell. See FIG. 3. Other retaining or catching devices instead of or in addition to the flange may be used so that the display swings open with the upper shell. For example, clips, clamps, or brackets may be used to clamp the display and upper shell together. These retaining or catching devices may be located anywhere on the upper shell (e.g., on one or more sides of the upper shell or at the top of the upper shell). Strips of adhesive-backed hook-and-loop fasteners (e.g., Velcro®) may be placed between the display and the upper shell.

In this specific implementation, the lower shell is formed from a second sheet metal. Third and fourth hinge members may be formed using a process similar to the process to form the first and second hinge members of the upper shell. Openings or cutouts in the lower shell to allow access to the ports of the computer, provide ventilation, and so forth may be made by cutting, stamping, drilling, or combinations of these. The location of the cutouts is determined based on the location of the ports, ventilation slots, and other features of the computer.

Left, right, back, and front walls of the lower shell may be formed using a process similar to the process to form the walls of the upper shell. Thus, like the upper shell, the lower shell is formed as a panel with four sides and bordered or surrounded by the left, right, back, and front walls of the lower shell.

The upper and lower shells are then hingedly connected. That is, the first and second hinge members of the upper shell are mated to the third and fourth hinge members of the lower shell.

Corner caps or other shock absorbing members may be attached to corners of the upper and lower shells. In this specific implementation, the lower shell includes a first corner cap and a second corner cap. The first corner cap is opposite the first hinge (i.e., the mated first and third hinge members). The second corner cap is opposite the second hinge (i.e., the mated second and fourth hinge members). Each corner cap includes a ledge or projecting edge that extends towards the hinges. See FIG. 6. The ledge extends over a portion of the base of the computer to help hold, secure, or retain the lower shell and computer (i.e., base or keyboard of the computer) together. For example, when the base of the computer is received by the lower shell, portions of the base will be between the projecting edges and a panel of the lower shell.

One or more strips of foam may be attached to an interior surface of the shells. The foam may be attached using an adhesive such as glue or epoxy. The strips of foam may include a pressure sensitive adhesive (PSA).

In a specific implementation, the upper shell includes first and second strips of foam placed at opposite ends or sides of the upper shell. For example, the first strip may be placed nearer to the front wall than the back wall of the upper shell. The second strip may be placed opposite the first strip, i.e., nearer to the back wall than the front wall of the upper shell.

In this specific implementation, the lower shell includes third and fourth strips of foam placed at opposite ends or sides of the lower shell. For example, the third strip may be placed nearer to the front wall than the back wall of the lower shell. The fourth strip may be placed opposite the third strip, i.e., nearer to the back wall than the front wall of the lower shell.

Thicknesses of the foam may be the same or may be different. In a specific implementation, a thickness of the second foam strip is greater than a thickness of the first foam strip. A thickness of the third foam strip is greater than a thickness of the fourth foam strip. The thickness of the foam strip may range from about 1 millimeter to about 15 millimeters. This includes, for example, 2, 3, 4, 5, 6, 7, 8, 9, 10, 11, 12, 13, 14, or 14.9 millimeters, or more than 15 millimeters. The thickness may be less than 1 millimeter.

A thick foam strip may be able to absorb more shock as compared to a thin foam strip. A thin foam strip may allow a smaller shell to be used with the computer as compared to a thick foam strip.

In a specific implementation, the lower shell is designed so that when the computer is received in the shell, the keyboard of the computer will be tilted towards the user. The keyboard may be tilted about 5 degrees towards the user, but the degree of tilt can range from about 1 degrees to about 15 degrees. This includes, for example, 2, 3, 4, 6, 7, 8, 9, 10, 11, 12, 13, 14, 14.9 degrees, or more than 15 degrees. The degree of tilt may be less than 1 degrees. The degree of tilt may be 0 degrees (i.e., no tilt). The keyboard may be tilted away from the user. This variation in the degree of tilt helps to accommodate the varying ergonomic preferences of various users.

In a specific implementation, different thicknesses of foam are used to help tilt the keyboard. For example, to tilt the keyboard towards the user, a strip of foam placed near the back wall of the lower shell may be thicker than a strip of foam placed near the front wall of the lower shell. The thicker strip of foam helps to lift or prop the back end of the keyboard towards the user. In this specific implementation, the height of left and right walls of the lower shell may taper from the back wall to the front wall so that the tops of the walls remain parallel to the keyboard.

Because the shell is designed to fit specific computer models, i.e., designed so that the hinge of the shell will be coaxial with the hinge of the specific computer model, a shell designed for one computer model may not fit another computer model. These two computer models, despite having the same length, width, and thickness may have a different axis about which their screens and keyboards pivot. Thus, a first computer may fit into a shell, but a second computer having the same length, width, and thickness may not fit into the shell.

Figure 7:
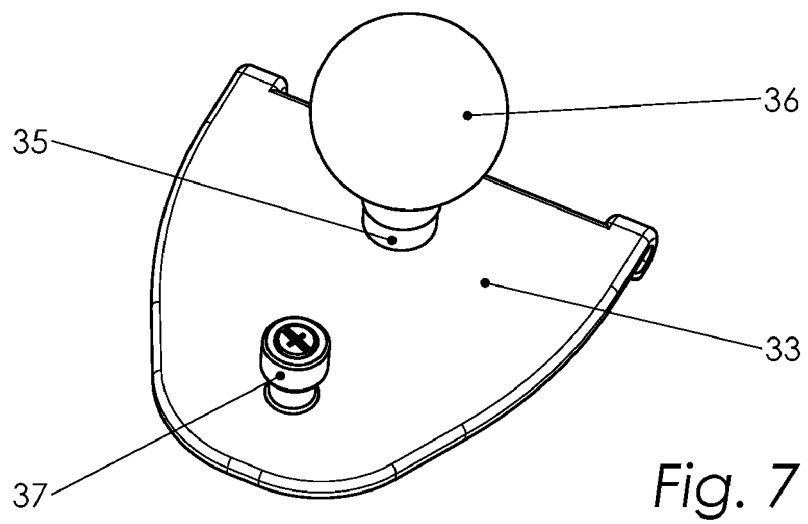
FIG. 7 shows a three-dimensional bottom view of a mounting plate with mounting ball.

FIGS. 7-9, 11, and 12 show one or more parts of a mounting assembly that may be used to secure the shell to another object or surface. FIG. 7 shows a perspective view of the bottom of a detachable mounting plate 33. The mounting plate may be referred to as the Quick Plate™ This mounting device is formed from sheet metal (e.g., aluminum, steel, brass, or titanium) or other suitable material such as plastic or carbon fiber.

Figure 8:
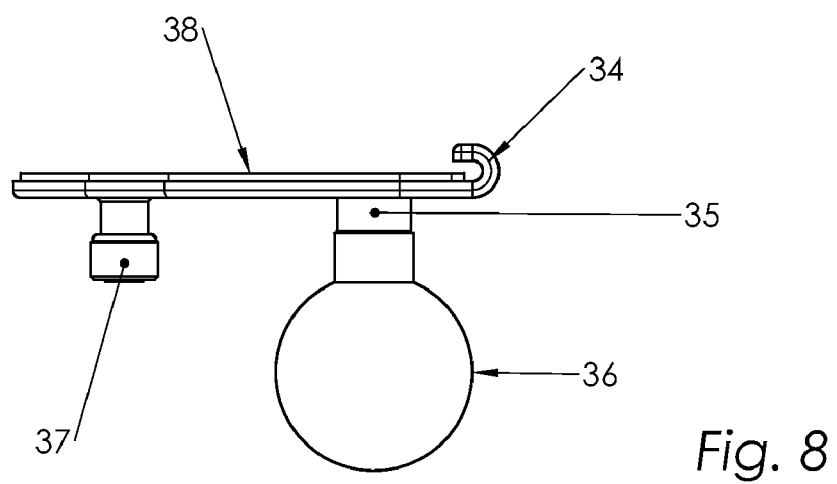
FIG. 8 shows a side view of the mounting plate with mounting ball.

FIG. 8 shows a side view of the detachable mounting plate. The detachable mounting plate includes two hooked mounting tabs 34, a self-retracting captive screw 37, a pad (e.g., foam pad) 38, and a mounting ball 36.

The mounting tabs form "U" shape hooks which slide into and interlock with corresponding slots 16 (FIG. 1) in the bottom face of the lower shell. A self-retracting captive screw 37 may be permanently pressed into place. The screw or bolt serves as a fastener to secure the mounting plate to the lower shell through a threaded mounting nut insert 17 (FIG. 1) which is located on the underside of the shell lower enclosure.

In a specific implementation, the screw is manufactured by PennEngineering. Generally, slots 16 and the threaded mounting nut insert or embedded fastener does not protrude or extend past the bottom face or surface of the lower shell. The embedded fastener may be flush with or recessed into the bottom surface of the lower shell. This allows the mounting plate to sit flush against the bottom surface of the lower shell. Pad 38, positioned between the bottom surface of the lower shell and a top surface of the mounting plate, can help absorb vibrations and prevent scratching of the lower shell.

The self-retracting or spring loaded thumb screw affords a quick and easy method to mount and detach the computer with shell by manually separating and reattaching these components using only fingers without the need for tools and with no loose parts. For example, the mounting tabs can help to position or orient the mounting plate on the lower shell. Then, the screw can be turned to secure the mounting plate to the shell. In some implementations, a single screw is used so that the mounting plate can be quickly attached and detached from the shell. The mounting tabs, being hooked into slots 16, can help to further secure the mounting plate to the shell (i.e., prevent twisting the mounting plate and shell relative to each other).

The mounting ball is secured to the detachable mounting plate via a clenched fastener 35. The clenched fastener is located in and pressed through a hole in the mounting plate. The clenched fastener provides means to attach mounting arms of various styles and configurations to the detachable mounting plate.

Figure 9:
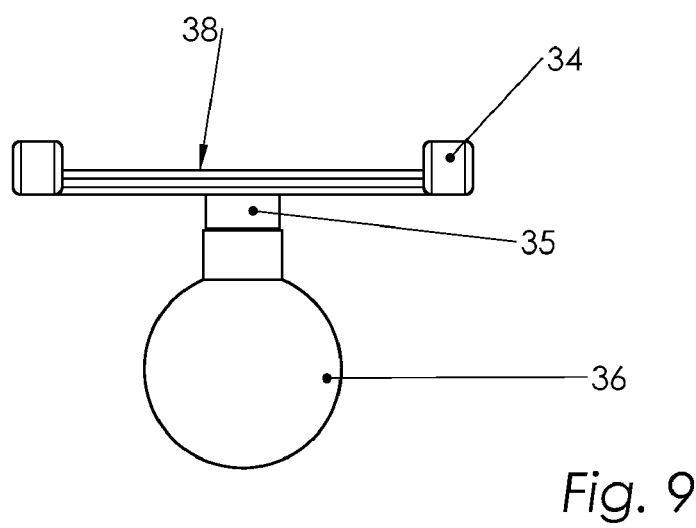
FIG. 9 shows a front view of the mounting plate with mounting ball.
Figure 11:
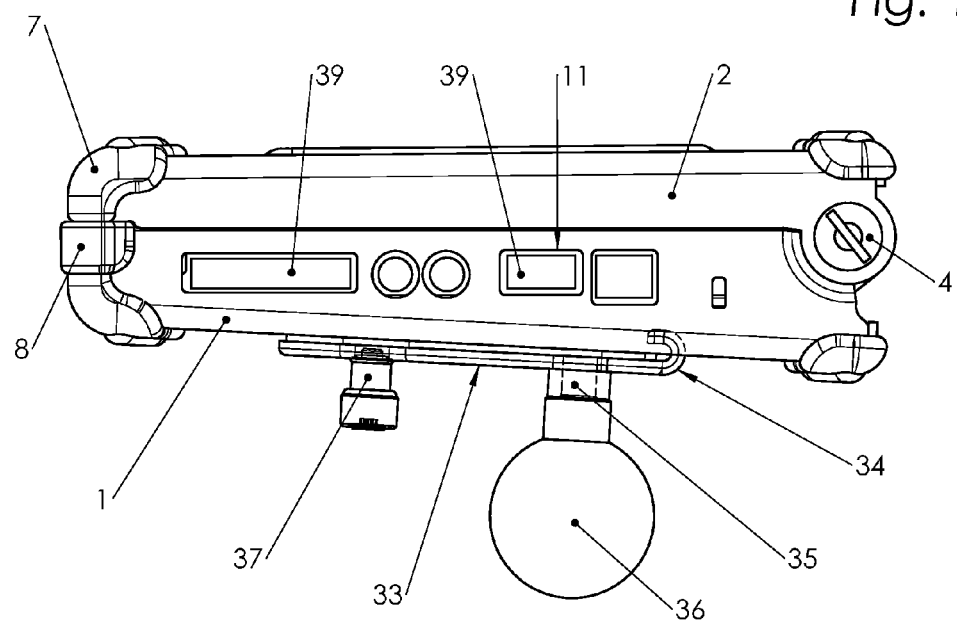
FIG. 11 shows a right-hand side view of the shell in a closed state with mounting plate attached.
Figure 12:
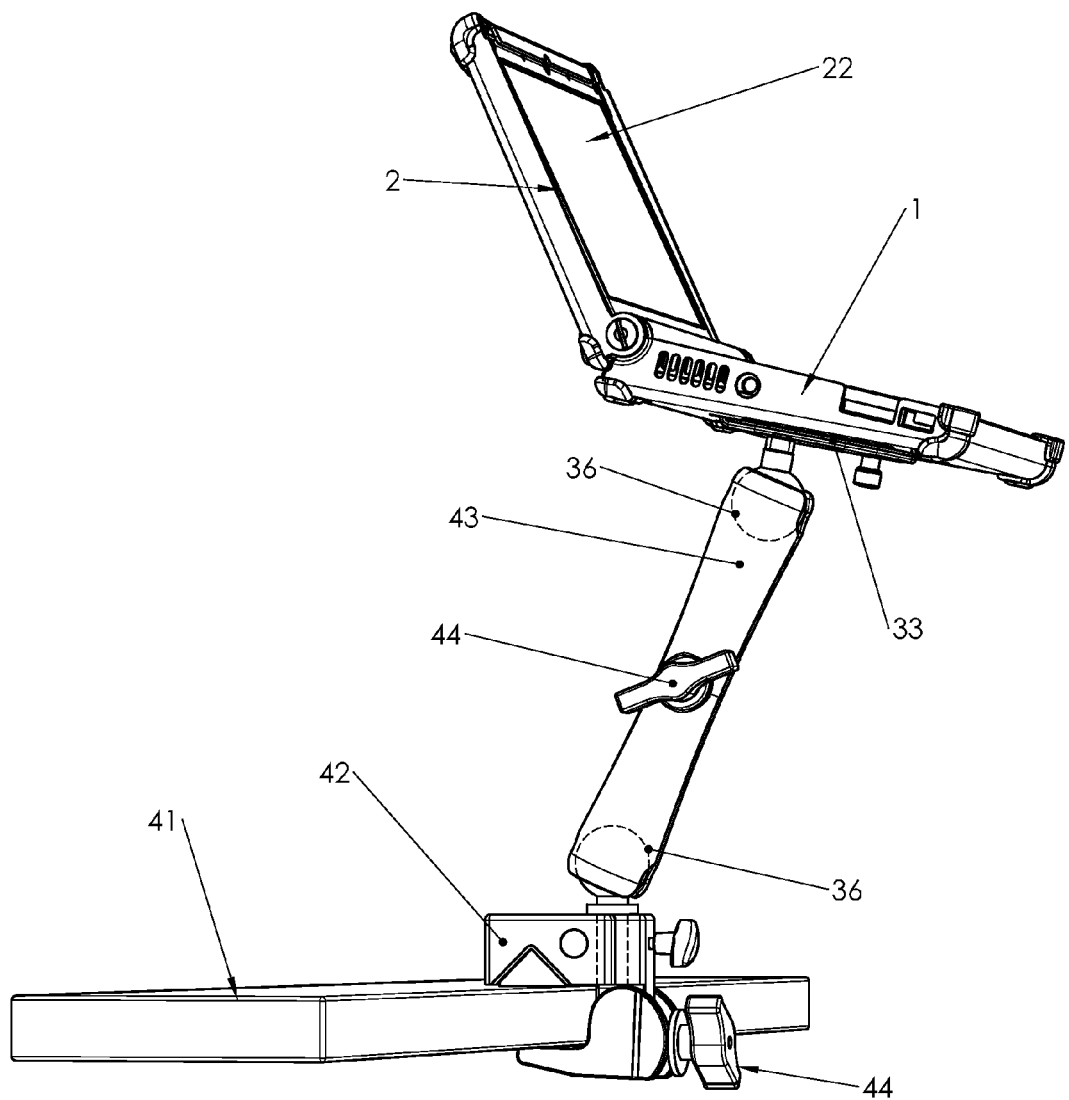
FIG. 12 shows a perspective view of the shell, computer, and mounting system together.

FIG. 9 shows a back view of the detachable mounting plate. FIG. 11 shows a side view of the detachable mounting plate attached to the shell. FIG. 12 shows a side view of a specific implementation of a mounting assembly. The mounting assembly includes mounting plate 33, a mounting clamp 42, and a mounting arm, rod, or shaft 43 between the mounting plate and mounting clamp. The mounting clamp is shown clamped to a clamping surface 41. An adjustment knob 44 allows a position of the mounting arm to be adjusted.

The mounting arm is connected to the mounting plate and the mounting clamp via a ball and socket assembly. That is, the mounting arm includes a socket at each end of the arm. Mounting plate 33 includes an upper or first mounting ball. Mounting clamp 42 includes a lower or second mounting ball. The first mounting ball is received in a socket at one end of the mounting arm. The second mounting ball is received in another socket at an opposite end of the mounting arm.

In a specific implementation, there is a mounting ball with threaded stem 36, such as that manufactured and sold by National Products Inc. (also known as RAM® Mounting Systems (RAM)), is affixed to the bottom of the mount base flange 33 by means of the female thread clenched fastener 35.

In this specific implementation, the mounting ball, an integral part of the RAM product line, allows maneuverability of the mounting arm 43 and computer shell and adapt the computer to a multitude of functional settings. These settings include walls, tables, benches, posts, railings, carts, vehicles and large equipment.

FIG. 12 shows one example of a mounting assembly configuration. There are two mounting balls 36 joined by an adjustable mounting arm. This embodiment permits the lower mounting ball to be attached to a fixed flange or a clamp 42 such as the Manfrotto Super Clamp™. The fixed flange, clamp, or both can be used to securely attach the shell to nearly any surface in any orientation. The surface can be flat or curved. For curved surfaces, the fixed flange can similarly be curved to match the curvature of the curved surface. The computer with shell and mounting device is thus attached in a secure manner, yet its positioning is adjustable and can be adapted for use in any setting that requires the computer to be held in a steady upright position.

The invention can be used in combination with many third party products such as with RAM and Manfrotto products. This invention offers an enhanced degree of protection, mobility, and security for a notebook computer. The shell structure protects exposed computer surfaces and corners from mild impact and abrasion while at the same time working in tandem with the mounting device to secure the computer to a wide variety of surfaces. Mobility is enhanced by allowing the shell to be closed around the computer when not in use and opened to allow use of the computer with or without attachment to the mounting device.

As one of skill in the art will recognize, the mounting assembly or variations of the mounting assembly can be used in passenger cars, forklifts, big-rig, and recreational vehicles (RV). The mounts can be attached to an office cart, exercise bicycle, work bench, laboratory counter, bed post, tripod, quad, or tractor. The mounts may be made available in kits (e.g., preconfigured kits). The mounting plate as described in this application allows the protective shell to be easily attached to and detached from mounting arms without having to use tools and without protruding hardware.

While dismounted, the computer (e.g., netbook) can remain safely cushioned within the protective shell. The protective shell can include protective rubber corners and can sit flat for use on any surface. While mounted, the protective case can be easily repositioned within the radial motion range of the mounting assembly. Some examples of kit configurations include clamp mount (e.g., clamp to desk), direct surface attachment (e.g., attach to wall), or in-vehicle bolt-on applications.

The lower shell may include a threaded tripod mounting nut insert 18 (FIG. 1) which allows the shell to be attached to a tripod or other structure. Similar to nut insert 17, nut insert 18 typically will not extend past a bottom surface of the lower shell. For example, nut insert 18 may be flush with the bottom surface of the lower shell. Nut insert 18 may extend past a top surface, opposite the bottom surface, of the lower shell. This helps to ensure that there is a sufficient amount of threads for a bolt of the tripod to thread into nut insert 18. Typically, nut insert 18 has a height that is less than a thickness of at least one of the pads. This helps to ensure that nut insert 18 does not press against the base of the computer. Figures A-KK in the appendix show a shell and specific examples of different types of mounting assemblies that may be used with the mounting plate to secure the shell to a structure (e.g., table, shelf, pole, tree branch, column, wall, floor, vehicle floorboard, or vehicle dashboard).

In a specific implementation, a design methodology includes a geometric manipulation used to vary the engineering pattern from one shell configuration to another. More specifically, since each supported computer model varies both in terms of size and hinge location, a means to convert the precise physical form of the clamshell into a shape compatible with the dimensions of each computer has been devised.

In this specific implementation, the basic form of the computer shell was developed using tools provided in Solid-Works® three-dimensional computer-aided design (CAD) engineering software. SolidWorks® is developed by Dassault Systèmes SolidWorks Corporation of Concord, Mass. These electronic tools are employed using the sheet metal feature module of the software. A specific embodiment of the shell uses metal sheets that are then molded, pressed, or formed into the desired shape. In this specific embodiment, the type of metal is aluminum, but may instead be steel, stainless steel, titanium, brass, bronze, copper, platinum, and the like.

It should be appreciated that the shell may be molded in a plastic material rather than folded in sheet metal using a series of bends and formed shapes. The shell may be constructed using carbon fiber. In a specific implementation, the shell is constructed using a rigid material. In this specific implementation, various components of the shell such as the upper shell, lower shell, and hinge members are made of a rigid material. These components may be made of the same rigid material. Using a single material to construct these components can save on manufacturing and material costs. In another implementation, the shell may instead by constructed using a flexible material such as cloth, leather, or nylon.

The methodology used includes setting up a table of actual computer measurements. These measurements become planes in space which are offset using formulaic computerized instructions which move the material planes and vary the hinge geometry to match conditions found in the specific computer being modeled. Thus a revised sheet metal bend table and a set of dimensional data are translated into both a three-dimensional computer model and a set of conventional engineering prints for each configuration. This process may be fully automated or partially automated. Generally, the dimensional planes and measurements become a reliable geometric foundation for the design configuration at hand.

The basic steps involved to convert a generic shell template into a specific shell geometry include:

1. The computer is measured using a digital caliper. Very careful attention is paid to accurately identifying and locating the hinge axis relative to the base and screen sections of the computer. A virtual three-dimensional model of the computer is constructed in SolidWorks® using techniques provided by the software.

2. Measurements of the computer itself now become the basis for design tables. An example of the design table for the lower shell is shown in table A below. An example of the design table for the upper shell is shown in table B below.

The tables include lists of measurements and angles which are used to direct the location of previously established planes within a Cartesian construct. The origin is established as the center point along the hinge axis 30. The x-y plane is established as the horizontal plane offset and parallel to the computer keyboard 24 which in effect is the split 51 or mating plane between the computer base 21 and the computer screen 22. The table values in each of the two tables match variables in the software models for the lower shell 1 and upper shell 2 respectively. The software responds to these instructions by moving the planes and incorporating offsets to ensure that the formulated sheet metal bends will be organized with specific tolerances allowing foam pads 10 and the front corner caps 8 to fit in a precise alignment with the computer being encased.

3. At this point the resulting computer shell model is tested by rotating the two halves along the hinge axis to determine rear flange positions which will allow the case to open fully without conflict.

4. The final step of design is to match scanned imaged of the computer side with the modeled version. With these scans scaled and aligned, it is possible to identify and configure the cutouts 11, which allow access to all important features and ports through the case flanges.

The computer shell model is now complete. All parts and pieces required to build an actual shell are fully modeled and move in accordance with the newly defined configuration. In this way, the computer axis is matched with that of the shell allowing them to move together in rotational alignment. The other significant benefit being the duplication of molded corners 7, hinge ear 3, and all other features of the design. This process ensures that all parts and their mating surfaces match exactly from one design to another.

Tables A and B below are design tables for the upper and lower shells, respectively. These design tables list some specific computer models and include some specific measurements and values for the variables used in constructing the computer shell model. The columns of values correspond to planes depicted in FIG. 14 which is a vertical cross section derived at the center of the computer with the screen closed. The rows correspond to various computer models which are supported by specific designs at the time of this writing. "D" values, indicated with three decimals are in millimeters. "A" values, indicated with two decimals are assigned to degrees in angles of measurement from a neutral plane.

A brief explanation of each variable is as follows:

1. D1-Split 51 is identified as a horizontal plane offset from the hinge axis by the indicated value minus 25.4 millimeters (i.e., 1 inch). This value appears on both the upper and lower tables. This plane determines the position of the split line between upper and lower shells relative to the hinge axis. The 25.4 millimeter or 1 inch offset is a mathematical convenience. For example, since there are "Split" planes that locate either above or below the hinge axis, it can be confusing to have both positive and negative offset dimensions. Therefore, 25.4 millimeters or 1 inch can be added to the measurement to arrive at the number in the table and instruct the software program to use a 25.4 millimeter or 1 inch offset plane rather than the true split location.

2. A2-Inter 52 is identified as a plane angled by the indicated value and pivoting on the hinge axis. This plane is used to determine the angle of the lowers shell base flange relative to split plane 51.

3. D2-Base 53 is identified as a plane parallel to inter plane 52 and offset the specified distance. This plane locates the base flange on the lower shell.

4. D3-Rear 54 locates the lower shell rear flange relative to the hinge axis and at a right angle to base plane 53.

5. D4-Front 55 locates the lower shell front flange relative to the hinge axis and at an angle specified by A4-Front.

6. A4-Front 55 is a calculated value equal to about 90 degrees minus A2.

7. D5-Side (not shown in FIG. 14) locates both side flanges on the lower and upper shells relative to the center point of the computer along the hinge axis and at a right angle to split plane 51. The value is shown in both upper and lower tables.

8. A6-Inter indicates the angle of the upper lid plane 56 relative to the split plane 51.

9. D6-Lid 56 locates the top flange of the upper shell at the indicated distance above the split plane and at the angle indicated by A6 departing from an intersection with the front plane 57.

10. D7-Rear locates the upper shell rear flange relative to the hinge axis minus 25.4 millimeters (i.e., 1 inch) and at a right angle to the lid plane 56.

11. D8-Front locates the lower shell front flange relative to the hinge axis and at an angle specified by A8-Front.

12. A4-Front 55 is a calculated value equal to about 90 degrees minus A6.

TABLE A

Figure 14:
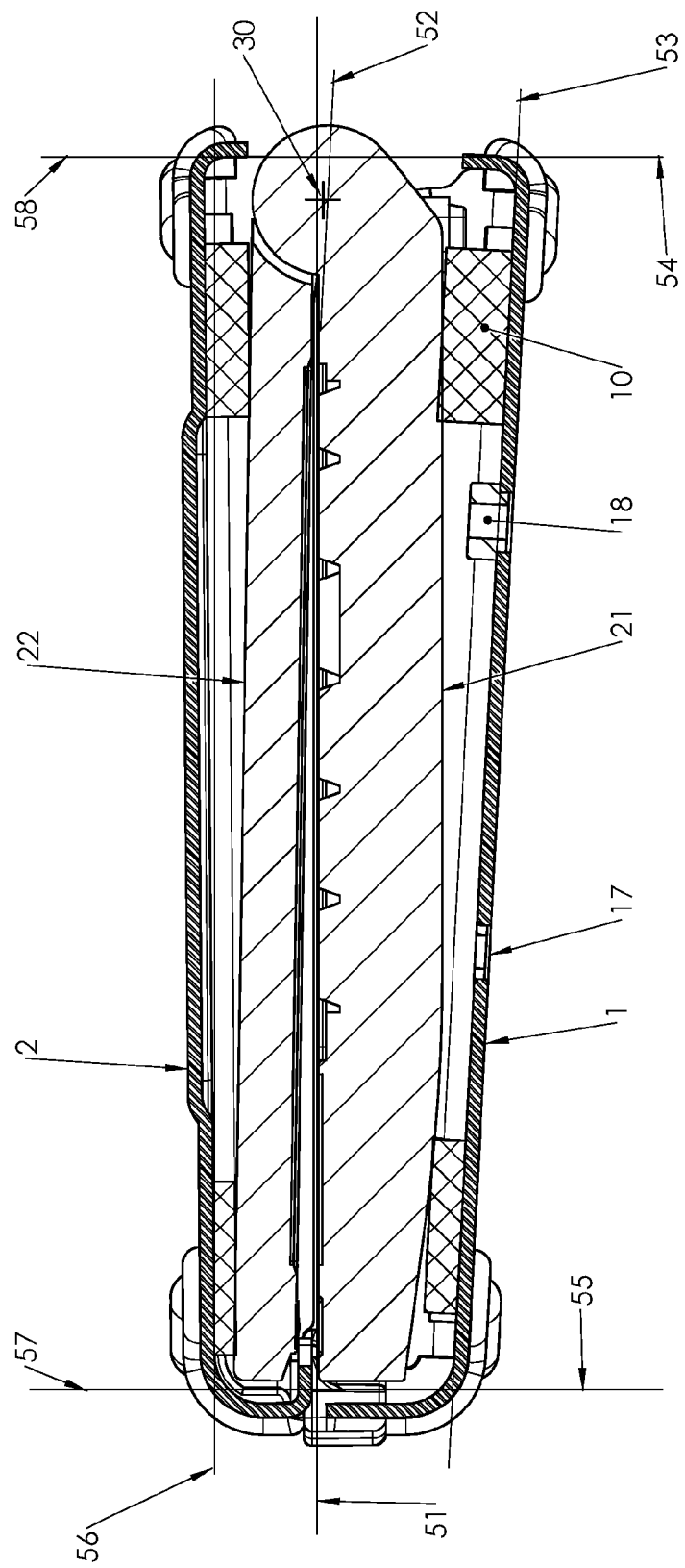
FIG. 14 shows a cross section view of the shell with a computer in the shell.

| | FIG. 14 Ref Label | | | | | | |
|---|---|---|---|---|---|---|---|
| Computer Model | 51 D1-Split (mm) | 52 A2-Inter (degrees) | 53 D2-Base (mm) | 54 D3-Rear (mm) | 55 D4-Front (mm) | 55 A4-Front (degrees) | D5-Side (mm) |
| AcerOne09 | 32.258 | 3.00 | 23.622 | 4.699 | 166.116 | 87.00 | 123.190 |
| AcerOne10 | 26.670 | 1.50 | 27.178 | 7.620 | 178.562 | 88.50 | 129.794 |
| Asus N10 | 20.828 | 4.50 | 39.370 | 10.160 | 192.024 | 85.50 | 138.430 |
| Dell 10 | 32.766 | 3.50 | 21.590 | 1.016 | 176.276 | 86.50 | 130.302 |
| Dell 1210 | 30.734 | 2.00 | 21.590 | 0.762 | 223.774 | 88.00 | 149.098 |
| Dell 910 | 35.052 | 4.50 | 23.622 | 0.635 | 166.116 | 85.50 | 116.332 |
| Eee 1000H | 25.654 | 4.75 | 34.290 | 6.350 | 181.610 | 85.25 | 132.842 |
| Eee 900 | 26.162 | 3.75 | 29.464 | 6.350 | 160.782 | 86.25 | 112.776 |
| Eee 902 | 24.003 | 4.00 | 32.258 | 7.620 | 165.735 | 86.00 | 112.268 |
| HP 1010 | 30.988 | 2.00 | 19.050 | 3.810 | 162.560 | 88.00 | 130.556 |
| HP2133 | 34.036 | 4.00 | 24.638 | 2.540 | 161.290 | 86.00 | 130.810 |
| Leno S10 | 26.924 | 3.00 | 27.432 | 6.350 | 174.244 | 87.00 | 124.714 |
| MSI U100 | 32.258 | 5.00 | 27.178 | 4.775 | 175.768 | 85.00 | 129.540 |
| MSI U120 | 31.75 | 4.75 | 29.464 | 2.540 | 175.768 | 85.25 | 131.064 |
| Sam NC10 | 31.496 | 3.50 | 26.670 | 3.556 | 175.641 | 86.50 | 130.302 |

TABLE B

| | FIG. 14 Ref Label | | | | | | |
|---|---|---|---|---|---|---|---|
| Model | 51 D1-Split (mm) | 56 A6-Inter (degrees) | 56 D6-Lid (mm) | 58 D7-Rear (mm) | 57 D8-Front (mm) | 57 A8-Front (degrees) | D5-Side (mm) |
| AcerOne09 | 32.258 | 1.50 | 14.986 | 31.750 | 166.116 | 88.50 | 123.190 |
| AcerOne10 | 26.670 | 1.00 | 14.986 | 27.000 | 177.800 | 89.00 | 129.794 |
| Asus N10 | 20.828 | 2.00 | 14.986 | 22.860 | 192.024 | 88.00 | 138.430 |
| Dell 10 | 32.766 | 0.50 | 14.986 | 32.258 | 176.276 | 89.50 | 130.302 |
| Dell 1210 | 30.734 | 0.50 | 14.986 | 31.750 | 223.774 | 89.50 | 149.098 |
| Dell 910 | 35.052 | 0.50 | 14.986 | 34.544 | 166.116 | 89.50 | 116.332 |
| Eee 1000H | 25.654 | 1.50 | 14.986 | 26.670 | 181.610 | 88.50 | 132.842 |
| Eee 900 | 26.162 | 0.50 | 14.986 | 31.750 | 160.782 | 89.50 | 112.776 |
| Eee 902 | 24.003 | 2.50 | 14.986 | 25.400 | 165.735 | 87.50 | 112.268 |
| HP 1010 | 30.988 | 1.00 | 14.986 | 30.480 | 162.560 | 89.00 | 130.556 |
| HP2133 | 34.036 | 1.00 | 14.986 | 31.750 | 161.290 | 89.00 | 130.810 |
| Leno S10 | 26.924 | 0.50 | 14.986 | 31.750 | 174.244 | 89.50 | 124.714 |
| MSI U100 | 32.258 | 0.50 | 14.986 | 31.750 | 175.768 | 89.50 | 129.540 |
| MSI U120 | 31.750 | 0.50 | 14.986 | 30.734 | 175.768 | 89.50 | 131.064 |
| Sam NC10 | 31.496 | 1.00 | 14.986 | 30.480 | 175.641 | 89.00 | 130.302 |

Based on the information in these tables, the SolidWorks® model which has been devised has enough information to build a virtual construct, drawings, and sheet metal specifications for each shell configuration shown in FIGS. 13A-13J. As can be seen, by closely comparing details from one model to another, the position of the hinge axis moves considerably, relative to the other design components, from one shell geometry to another. Other additional inputs include those derived from individual side view scans as detailed in step 4 previously.

This modeling method is a time efficient process which ensures a precise fit and compatibility of the computer shell with the computer being enclosed. This specific design method can be used with a wide range of computer models to create specific shells that fit specific computer models.

In a specific implementation, a method of making the protective shell includes measuring a portable computer to determine information indicating an axis about which first and second sections of the portable computer rotate. The information is then used to modify a generic template file to create a specific template file. This specific template file is provided to a computer numerical control (CNC) machine to form first and second shells for the portable computer. Examples of machines that may be used in making the shells include CNC bending machines, shearing machines, punching and forming machines, laser cutting machines, milling machines, and the like.

After the shells are formed, the shells are hingedly connected together. The portable computer can be encased by the first and second shells while the first and second shells are hingedly connected. Conversely, the computer can be removed from the shells while the shells are hingedly connected.

The specific template file can include information indicating a distance from the axis to a sidewall of the first shell, the sidewall extending in a direction parallel to the axis or opposite the hinges. The specific template file can include information indicating a distance from the axis to a keyboard of the portable computer.

The method may further include attaching a clip including rubber to the second shell where a portion of the clip overlaps a portion of an opening of the second shell. The opening is defined by sidewalls of the second shell.

Numerous mounting arms, goosenecks, stems, brackets, clamps or various attachments may be adapted to implement the mount using means other than the ball and arm shown in FIG. 12. There are also many alternative ways to implement the basic components of this invention. The mounting device itself can be fixed to computers by alternative means such as a tray upon which the computer rests. The mounting device could thus be attached by means of the same slot pattern in the base of a tray. Likewise, the computer and enclosing shell can certainly be used beneficially without implementation of the mounting device. While the shell and mounting device have been conceived as a symbiotic pair, either may be successfully implemented without the other.

The shell may be secured to the computer using hook-and-loop fasteners (e.g., Velcro®), straps, buttons, buckles, clamps, and so forth. The shell may be colored using a process such as anodizing, painting, or powder coating. Some examples of colors include red, green, blue, yellow, and black. The colors can help indicate the computer model that the will fit in the shell.

One or more labels may be attached to the shell. The label can be used to indicate the computer model that will fit in the shell, the owner of the computer, or both. The label may be attached using an adhesive. The label may be formed using any process to make visible impression on the shell (e.g., etching, carving, stamping, painting, or masking).

Surfaces of the shell may be processed to create a textured surface. Such a surface can help prevent the shell from slipping from a user's hands. Some examples of surface processing include knurling, abrasive blasting (e.g., sandblasting), and chemical etching. Portions of the surface may be covered or coated in rubber, leather, fabric, or cloth.

One or more straps, handles, or both may be attached to the shell so that the shell carried on the user's shoulder, by the user's hand, or both. The straps may be attached to the shell via slots or openings in the shell similar to those used for ventilation or for access to the various ports of the computer. The straps can also allow the shell-encased computer to be used while the user is standing.

The shell may include a locking mechanism so that the shell can be locked to another object. For example, the shell may include a closed loop that allows a cable to pass through the loop. The cable can then be secured to another objection using a lock. The shell may include security slot such as a Kensington® Security Slot (i.e., K-slot or Kensington lock) or any other type of anti-theft device.

It is also perfectly possible that the form of the computer shell may take on different shapes and visual attributes. Examples of these potential variations include square versus round corners, folds versus miters, and so forth. Soft protective corners may be any shape, any size, or both that accommodates the functional requirement of mating the shell to the shape of a specific computer. Cut-outs are clearly flexible in terms of location but typically accommodate the basic functional requirements needed to operate the computer.

In a specific implementation, a device for encasing a portable computer includes a top shell, a bottom shell, a first hinge, and a second hinge, opposite the first hinge. The first and second hinges pivotly connect the top and bottom shells. When the top and bottom shells receive the portable computer a first axis passing through the first and second hinges passes through a hinge of the portable computer.

The first and second hinges are approximately coaxial with the hinge of the portable computer when the top shell receives a display of the portable computer and the bottom shell receives a base of the portable computer. The portable computer is removable from the device. An example of the portable computer is a netbook.

The bottom shell includes sheet metal, each end of the sheet metal being bent to form a wall of the bottom shell. At least one wall of the bottom shell includes at least one opening.

When the portable computer is encased within the top and bottom shells, a universal serial bus (USB) plug can pass through the at least one opening and be received by a USB socket of the portable computer. A height of a back wall may be less than a height of left, right, or front walls.

The first hinge may include a first hinge ear formed from a wall of the top shell, a second hinge ear formed from a wall of the bottom shell, and an O-ring between the first and second hinge ears. There can be a rod having first threads and passing through the first hinge ear, through the O-ring, and into the second hinge ear. The first threads engage with second threads of the second hinge ear.

The second hinge ear is offset from a surface of the wall of the bottom shell by at least a thickness of the wall of the top shell. A flange extends away from a front wall of the top shell towards the first and second hinges. When a display of the portable computer is received by the top shell a portion of the display is between the flange and a panel of the top shell. When the device receives the portable computer, the portable computer is in an open position.

The bottom shell includes a first corner cap, opposite the first hinge and a second corner cap, opposite the second hinge. Each of the first and second corner caps include a projecting edge. When a base of the portable computer is received by the bottom shell, the projecting edges overlap portions of the base.

The device may further include a first strip of foam connected to an interior surface of the top shell and a second strip of foam connected to an interior surface of the bottom shell. The first strip of foam is arranged nearer to a back wall of the top shell than a front wall of the top shell. The second strip of foam is arranged nearer to a back wall of the bottom shell than a front wall of the bottom shell.

The device of may further include a first mounting plate removably connected to a bottom surface of the bottom shell, a second mounting plate, and a rod, between the first and second mounting plates. The rod includes a socket at each end of the rod for receiving a mounting ball of the first mounting plate and a mounting ball of the second mounting plate.

In a specific implementation, a device for encasing a portable computer includes a top shell including a first metal panel having sides bent to form first walls, a first hinge ear extending from an end of a first left wall, a second hinge ear, opposite the first hinge ear, extending from an end of a first right wall, a flange bent from a portion of a first front wall, and first and second foam strips coupled to the first metal panel.

A bottom shell includes a second metal panel having sides bent to form second walls, a third hinge ear extending from an end of a second left wall, a fourth hinge ear, opposite the third hinge ear, extending from an end of a second right wall, at least one opening formed on at least one of the second left or right walls, and third and fourth foam strips coupled to the second metal panel;

A first pivot bolt passing through a hole in the first and third hinge ears pivotly connect the first and third hinge ears. A first O-ring is between the first and third hinge ears.

A second pivot bolt passing through a hole in the second and fourth hinge ears pivotly connect the second and fourth hinge ears. A second O-ring is between the second and fourth hinge ears.

A plurality of corner caps are connected to each corner of the device. First and second corner caps are connected to corners of the bottom shell. Each cap includes a projecting edge. When the top shell receives a display of the portable computer and the bottom shell receives a base of the portable computer, an axis passing through the first, second, third, and fourth hinge ears passes through a hinge coupling the display and base, portions of the base are between the second metal panel and the projecting edges, a portion of the display is between the first metal panel and the flange, and the at least one opening is aligned with a port on the portable computer.

In a specific implementation, a method includes determining a first axis about which a display and a keyboard of a first portable computer pivot. The method further includes based on the first axis, forming first and second hinge members on a first clamshell component and forming third and fourth hinge members on a second clamshell component. The method includes hingedly connecting the first and second clamshell components via the hinge members. After the display is received by the hingedly connected clamshell components, opening the first clamshell component pivots the display away from the keyboard.

The method may further include determining a location of a DC power jack on the first portable computer and, based on the location, creating an opening in at least one of the first or second clamshell components. When the first and second clamshell components encase the first portable computer and the first and second clamshell components are closed, the DC power jack is exposed through the opening.

In an implementation, the first portable computer and a second portable computer have the same length, width, and thickness. The first portable computer can be encased by the first and second clamshell components. The second portable computer can not be encased by the first and second clamshell components. For example, the second portable computer may have a hinge axis that is different from the hinge axis of the first portable computer.

In an implementation, a second axis, parallel to the first axis, passes through the hinge members and a distance between the first and second axes ranges from about 0 millimeters to about 1.5 millimeters.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A device for protecting a portable computer comprising:
first and second shells hingedly coupled together by a first hinge and a second hinge, opposite the first hinge, each shell defining an interior space;
a first clip, extending from a sidewall of the first shell and over a portion of the interior space of the first shell;
a second clip, comprising a resilient material, extending from a sidewall of the second shell and over a portion of the interior space of the second shell, wherein a portion of a first hinged section of the portable computer can be inserted underneath the first clip and a portion of the second clip is capable of being resiliently bent to allow a second hinged section of the portable computer to slip past the resiliently bent portion of the second clip and into the interior space of the second shell; and
a mounting assembly, removably coupled to the second shell, comprising:
a mounting plate having a hook to hook onto a slot on a bottom surface of the second shell;
a bolt, passing through a hole in the mounting plate, and having threads to threadably engage with a threaded hole on the bottom surface of the second shell;
a ball, coupled to the mounting plate; and
a rod, wherein the ball is received in a socket at an end of the rod.

2. The device of claim 1 wherein the second clip comprises an elastomer.

3. The device of claim 1 comprising a third clip, comprising the resilient material, wherein the second clip is at a first corner of the second shell, opposite the first hinge, and the third clip is at a second corner of the second shell, opposite the second hinge.

4. The device of claim 1 wherein the first clip is made of a material different from the second clip.

5. The device of claim 1 wherein the resilient material is deformable by a user.

6. The device of claim 1 wherein the second clip is formed as a part separate from the second shell.

7. The device of claim 1 wherein the first clip comprises metal and the second clip comprises rubber.

8. The device of claim 1 wherein the second clip covers a top corner of the second shell and a bottom corner, opposite the top corner, of the second shell.

9. The device of claim 1 comprising a plurality of foam strips, wherein at least one foam strip is coupled to an interior surface of the first shell and at least one of another foam strip is coupled to an interior surface of the second shell.

10. The device of claim 1 wherein the first and second hinges are approximately coaxial with a hinge of the portable computer.

11. A device comprising:
a protective shell for a portable computer comprising:
first and second shell parts, each made of metal, hingedly coupled together by a first hinge and a second hinge, opposite the first hinge, each shell part defining an interior space;
a flange, formed from a sidewall of the first shell part, and extending from the sidewall of the first shell part and over a portion of the interior space of the first shell part;
a first foam strip, coupled to an interior surface of the first shell part, wherein the flange overlaps a portion of the first foam strip;
a second foam strip, coupled to the interior surface of the first shell part, wherein the second foam strip is closer to the first and second hinges than the first foam strip; and
first and second corner caps, each made of rubber, wherein a portion of each corner cap extends over a portion of the interior space of the second shell part, the first corner cap is coupled to a first top corner of the second shell part, the second corner cap is coupled to a second top corner of the second shell part, opposite the first top corner,
after a portion of a first hinged section of the portable computer is inserted between the first flange and the first foam strip, the portion of each corner cap is bent to allow a second hinged section of the portable computer to be placed into the interior space of the second shell, and when the first shell part is pivoted away from the second shell part, the first hinged section of the portable computer pivots with the first shell part; and
a mounting assembly comprising:
a first mounting plate comprising a hook for hooking a slot on a bottom surface of the second shell part;
a first mounting ball, coupled to the first mounting plate; and
a shaft comprising a first socket at an end of the shaft to receive the first mounting ball, wherein a screw can pass through the mounting plate and be received by a fastener embedded in the second shell part, wherein the fastener does not extend past the bottom surface of the second shell part.

12. The device of claim 11 wherein the shaft comprises a second socket at an opposite end of the shaft to receive a second mounting ball.

13. The device of claim 12 comprising a second mounting plate, wherein the second mounting plate is coupled to the second mounting ball.

14. The device of claim 12 comprising a clamp, wherein the clamp is coupled to the second mounting ball.

15. The device of claim 1 wherein the first and second shells are made of metal.

16. The device of claim 1 wherein the second clip is coupled to the second shell via a screw.

17. The device of claim 1 wherein the mounting assembly comprises an adjustment knob coupled to the rod.

18. The device of claim 1 wherein the bolt is a spring loaded thumb screw.

19. The device of claim 11 wherein the metal is aluminum.

20. The device of claim 11 wherein the mounting assembly comprises an adjustment knob coupled to the shaft.

* * * * *